US012584507B2

(12) United States Patent
Bente et al.

(10) Patent No.: US 12,584,507 B2
(45) Date of Patent: Mar. 24, 2026

(54) DEVICE FOR COMPENSATING FOR TOLERANCES BETWEEN TWO COMPONENTS TO BE CONNECTED TO ONE ANOTHER

(71) Applicant: Witte Automotive GmbH, Velbert (DE)

(72) Inventors: Jan Christian Bente, Sprockhövel (DE); Volkan Kandemir, Essen (DE)

(73) Assignee: Witte Automotive GmbH, Velbert (DE)

( * ) Notice: Subject to any disclaimer, the term of this patent is extended or adjusted under 35 U.S.C. 154(b) by 249 days.

(21) Appl. No.: 18/325,173

(22) Filed: May 30, 2023

(65) Prior Publication Data

US 2023/0383773 A1    Nov. 30, 2023

(30) Foreign Application Priority Data

May 30, 2022    (DE) ..................... 10 2022 205 449.0

(51) Int. Cl.
*F16B 5/02* (2006.01)
*F16B 2/04* (2006.01)
(52) U.S. Cl.
CPC .............. *F16B 5/0233* (2013.01); *F16B 2/04* (2013.01); *Y10T 403/7069* (2015.01)
(58) Field of Classification Search
CPC ..... B60R 2011/0052; B60R 2011/0059; B60R 2011/0066; B60R 2011/0071;
(Continued)

(56) References Cited

U.S. PATENT DOCUMENTS 3,776,651 A * 12/1973 Peter .......................... F16D 1/09
403/370
5,558,457 A * 9/1996 Mullenberg ............ F16D 1/095
403/370
(Continued)

FOREIGN PATENT DOCUMENTS

CN        111828458 A    10/2020
DE        4224575 A1    3/1993
(Continued)

OTHER PUBLICATIONS

German Patent Office, Search Report in Application No. DE 10 2022 205 449.0, dated Feb. 18, 2023, 8 pages, Munich, Germany.
(Continued)

*Primary Examiner* — Josh Skroupa
(74) *Attorney, Agent, or Firm* — Marshall & Melhorn, LLC

(57)        ABSTRACT
A device for compensating for tolerances between two components to be connected to one another where the device may have a base element a compensating element. The compensating element may prior to assembly with a thread play be in threaded engagement with a first component, and into which the base element can be inserted. The device may also have a connecting element which can be inserted through the base element to connect the two components. During assembly, the connecting element may come into engagement with the base element and the base element may engage in a force-fitting manner, in particular by frictional engagement or in a form-fitting manner, into the compensating element in such a manner that the compensating element enters into play-free, play-reduced and/or self-locking engagement with the first component.

18 Claims, 25 Drawing Sheets

(58) Field of Classification Search

CPC ....... B60R 2011/008; B60R 2011/0085; F16B 2/04; F16B 5/02; F16B 5/0216; F16B 5/0233; F16B 5/025; F16B 5/0283; F16B 5/0628; F16B 13/063; F16B 37/085; Y10T 403/7009; Y10T 403/7011; Y10T 403/7051; Y10T 403/7052; Y10T 403/7056; Y10T 403/7067; Y10T 403/7069

USPC ............ 403/350, 351, 367, 368, 370, 374.3, 403/374.4

See application file for complete search history.

(56) References Cited

U.S. PATENT DOCUMENTS

| | | | | |
|---|---|---|---|---|
| 6,669,425 | B1 * | 12/2003 | Preta | F16B 5/0275 411/453 |
| 6,712,544 | B2 * | 3/2004 | Kruger | F16B 5/0233 403/370 |
| 7,086,896 | B2 * | 8/2006 | Edwards | H05K 7/142 439/573 |
| 7,488,135 | B2 * | 2/2009 | Hasegawa | F16B 5/0233 403/22 |
| 8,979,417 | B2 * | 3/2015 | Wandelt | F16B 5/025 403/350 |
| 9,618,051 | B2 * | 4/2017 | Heston | F16D 1/094 |
| 11,187,256 | B2 * | 11/2021 | Benthien | F16B 5/02 |
| 11,454,265 | B2 * | 9/2022 | Figge | F16B 5/0233 |
| 11,668,337 | B2 * | 6/2023 | Mosch | F16B 5/0283 411/546 |
| 2002/0159829 | A1 | 10/2002 | Kruger et al. | |
| 2009/0263180 | A1 * | 10/2009 | De Gelis | F16B 5/0233 403/22 |
| 2010/0221065 | A1 * | 9/2010 | Zubiaurre Alberdi | B25G 3/28 403/350 |
| 2019/0383316 | A1 | 12/2019 | Dull et al. | |

FOREIGN PATENT DOCUMENTS

| | | | | |
|---|---|---|---|---|
| DE | 19650864 | A1 | 6/1998 | |
| DE | 19650864 | B4 | 10/2006 | |
| DE | 102011056465 | A1 | 6/2013 | |
| DE | 102012007996 | A1 | 10/2013 | |
| DE | 102018132192 | A1 | 6/2020 | |
| EP | 1400703 | A1 * | 3/2004 | F16B 9/023 |
| GB | 993611 | A * | 6/1965 | F16B 5/025 |

OTHER PUBLICATIONS

China National Intellectual Property Administration Office Action Re: Application No. 202310621042.6—10 pages, dated Dec. 4, 2025 Beijing, China.

* cited by examiner

DEVICE FOR COMPENSATING FOR TOLERANCES BETWEEN TWO COMPONENTS TO BE CONNECTED TO ONE ANOTHER

FIELD

The invention relates to a device for compensating for tolerances between two components to be connected to one another.

BACKGROUND

Known devices for compensating for tolerances between two components (also called compensating device for short) are formed by a base element or body, metallic threaded sleeve, and an axial compensating element, for example metallic threaded sleeves, which are in a threaded engagement, for example left-hand thread engagement. A spring element is usually arranged in the axial compensating element, and creates a frictional connection between a connecting element that is passed through the compensating device and has a further thread (right-hand thread) and the axial compensating element, so that when the connecting element is tightened, for example rotated, a torque is exerted on the axial compensating element, which causes axial unscrewing of the compensating element from the base element against the insertion direction of the connecting screw and thus compensates for axial tolerances.

SUMMARY

The object of the invention is to specify a particularly simply constructed device for compensating for tolerances between two components to be connected to one another.

The object is achieved according to the invention by a device with the features of the claims for compensating for tolerances between two components to be connected to one another.

The dependent claims relate to advantageous developments.

The object is achieved according to the invention by means of a device for compensating for tolerances between two components to be connected to one another, wherein the device comprises at least one hollow-cylindrical base element, a hollow-cylindrical compensating element, which is in threaded engagement with one of the components prior to assembly with a thread play and into which the base element can be inserted, and a connecting element which can be inserted through the base element for connecting the two components, wherein, during assembly, the connecting element comes into engagement with the base element, and the base element engages in the compensating element in a force-fitting manner, in particular in a frictionally engaged or form-fitting manner, in such a manner that the compensating element comes into play-free, play-reduced and/or self-locking engagement with the component.

A play-free, at least play-reduced and/or self-locking engagement of the base element and compensating element is understood in particular to mean a form-fitting and/or force-fitting wedging (also referred to as a conical wedging) of the two elements, such that they are fixedly connected to one another and are immovable relative to one another, in particular are blocked against rotation relative to one another.

The advantages achieved with the invention consist in particular in the fact that an automatic tolerance compensation with slight action of a lifting force is made possible by means of such a play-free, play-reduced and/or self-locking engagement of the compensating element with one of the components to be connected during the assembly process. As a result, instead of a metallic compensating element and/or a metallic base element, plastic components and thus a compensating element and/or a base element made of plastic can also be used. Such a device for compensating for tolerances is thus independent of the material. Such a device additionally allows improved radial mobility and, after assembly, an improved play-free, play-reduced and/or self-locking device.

The base element can have, for example, an outer shape with changing geometry. In the context of the present invention, an "outer shape of the base element" is to be understood in principle as a geometry or shape of an outer face or surface of the base element. In particular, the outer shape can taper along the longitudinal extent of the base element. For example, the outer shape can have a continuous tapering at least at one point or at least at one portion along the longitudinal extent in the installation direction or the insertion direction.

The base element can have, for example, an outer shape with a geometry that changes in portions. The base element can have, for example, an outer shape which tapers at least in portions, in particular an outer shape which tapers at least in portions in longitudinal extent, and a cylindrical inner shape.

The outer shape can taper or narrow, for example, in longitudinal extent towards a center line. The base element has, for example, an upper end and a lower end. The outer shape of the base element can be widened or enlarged, for example, at the upper end and can be tapered at the lower end. The outer shape of the base element can have at least two portions, wherein in particular a tapering portion of the outer shape adjoins a straight portion of the outer shape, for example. The base element can be circular, oval or polygonal in cross section. In particular, the base element has a conical outer shape at least in portions. The conical outer shape allows a force-fitting engagement of the base element with the compensating element, in particular a wedged engagement for rotary entrainment, in a simple manner.

For this purpose, the compensating element has, in particular, such a corresponding inner shape in order to produce a rotary force fit or a rotary form fit between the compensating element and the base element. A "rotary force fit or rotary form fit" is understood in particular to mean a frictional connection, in particular a wedging, and thus a fixed connection between the compensating element and the base element without further connecting elements. In this case, the base element acts linearly and rotationally on the compensating element, the base element actuating the compensating element by means of the rotary form fit or rotary force fit during the assembly process.

The compensating element can have, for example, an inner shape, in particular cylindrical or conical, in particular at least partially widening or tapering in longitudinal extent, and a cylindrical outer shape with one or more threaded outer portions. The threaded outer portions have, for example, such a steep thread that the thread play between the compensating element and the component is formed before assembly.

In particular, the base element has a changing outer shape and the compensating element has an inner shape that is changed in a complementary manner. In particular, the base element and the compensating element have toroidal shapes and are configured to wedge conically.

In addition, during assembly the base element can be further displaceable into the compensating element and can come into engagement, in particular an engagement under force, for example a wedged engagement or frictional engagement, such that a thread of the compensating element engages radially in a counter-interface of the component. and the compensating element and the counter-interface of the component can be fixable self-lockingly, in particular by clamping or wedging. The thread of the compensating element is designed, for example, as an external thread with a steep external thread pitch. The counter-interface of the component is provided, for example, as an internal thread with an internal thread pitch corresponding to the steep external thread pitch.

During assembly of the device, a torque exerted by the connecting element is preferably transmittable, on the basis of the engagement under force, to the base element for rotary entrainment.

The compensating element can also be designed to be at least partially deformable. For example, the cylindrical inner shape of the compensating element can be provided with at least one or more expansion regions. For example, each expansion region can be designed as a u-shaped or undulated widening in at least an inner region of the inner shape of the compensating element. In this case, such an expansion region is designed in particular in those regions which are opposite thread-free outer portions of the outer shape of the compensating element.

In addition, the compensating element can comprise on one of its longitudinal ends a transport securing means for securing the compensating element in the component during transport and before the assembly of the device. For example, the transport securing means can be formed as a molding, in particular an annular rib or rib segments, which projects radially from the outer circumference.

Furthermore, the base element and the compensating element can be connectable via a pre-connection, in particular a latching, to form a pre-assembly unit. For example, the base element can have a retaining edge or retaining bead at its tapered end. The compensating element can comprise, for example, a retaining receptacle or retaining groove corresponding to the retaining edge or retaining bead.

In addition, in the assembled state, the base element and the compensating element can be clamped play-free axially relative to one another. For example, the base element or the compensating element can comprise a plurality of clamping elements, in particular protruding axially from an end face, which clamp the base element and the compensating element play-free axially relative to one another in the assembled state.

DESCRIPTION OF THE FIGURES

Embodiments of the invention are explained in greater detail with reference to the drawings, in which.

4

Figure 4:
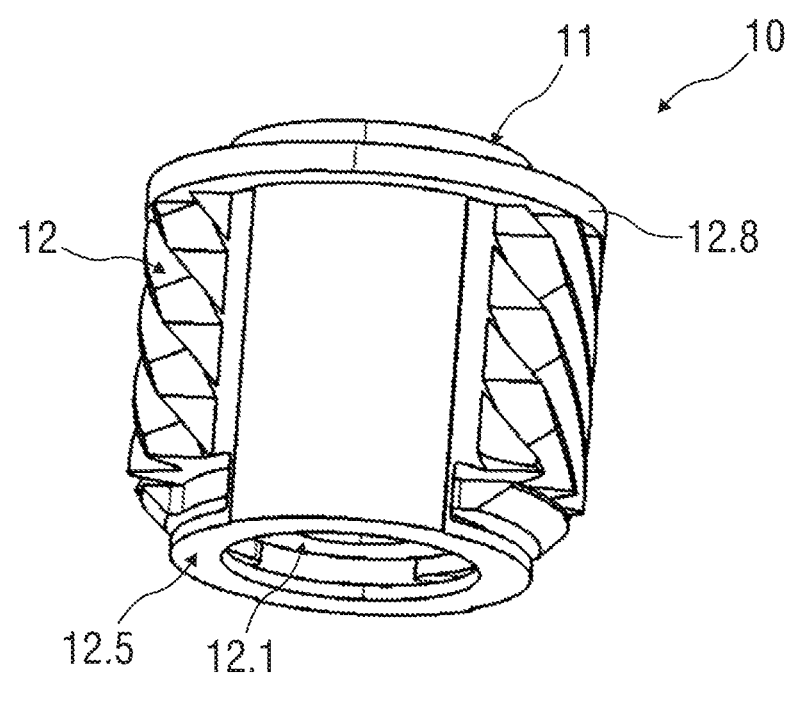
Figure 5:
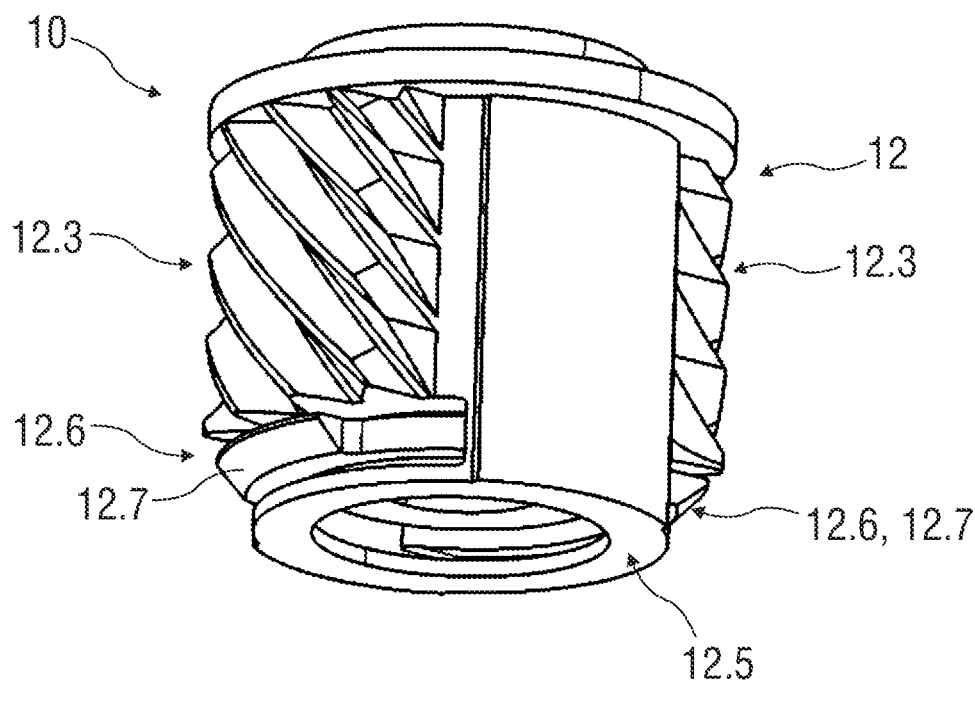
Figure 6:
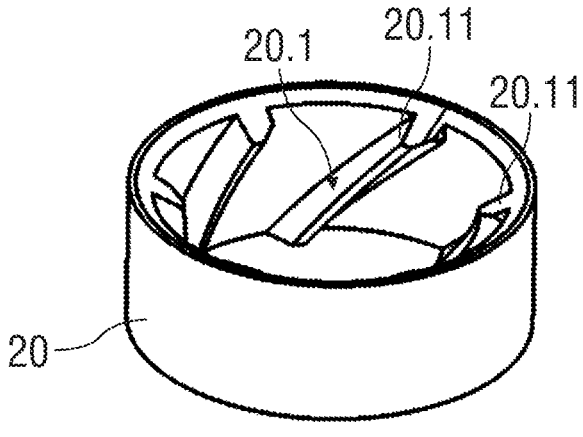
Figure 7:
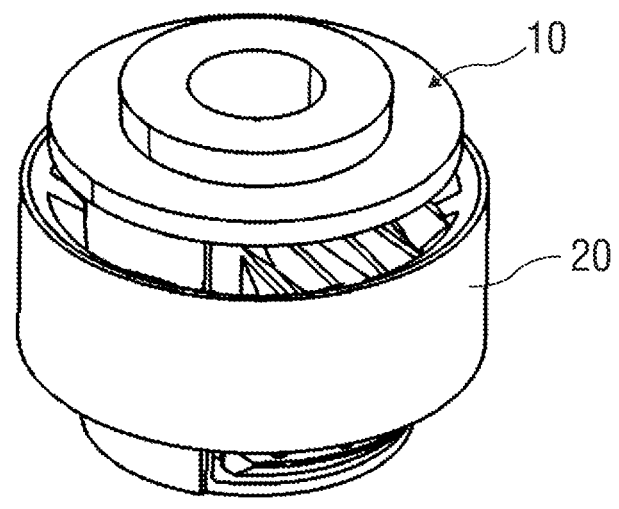
Figure 8:
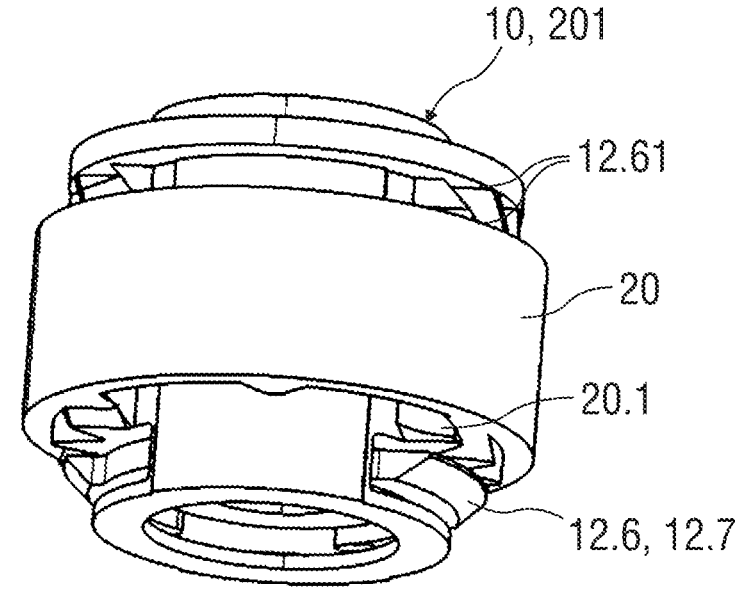
Figure 9:
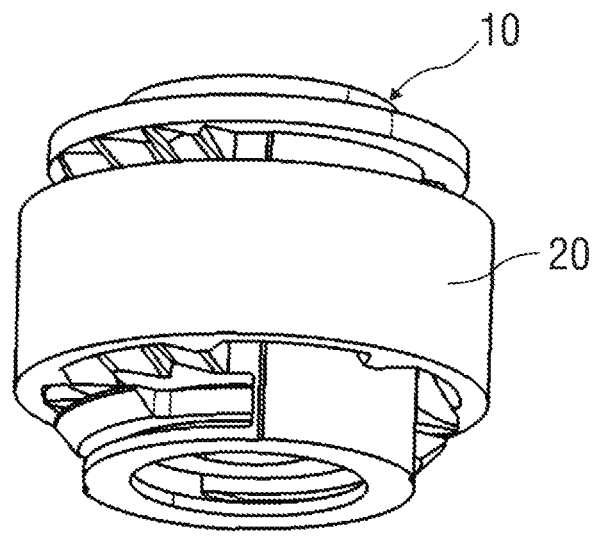
Figure 10:
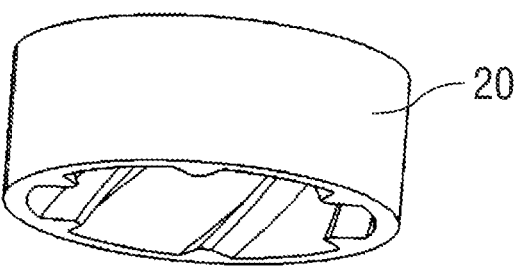
Figure 11:
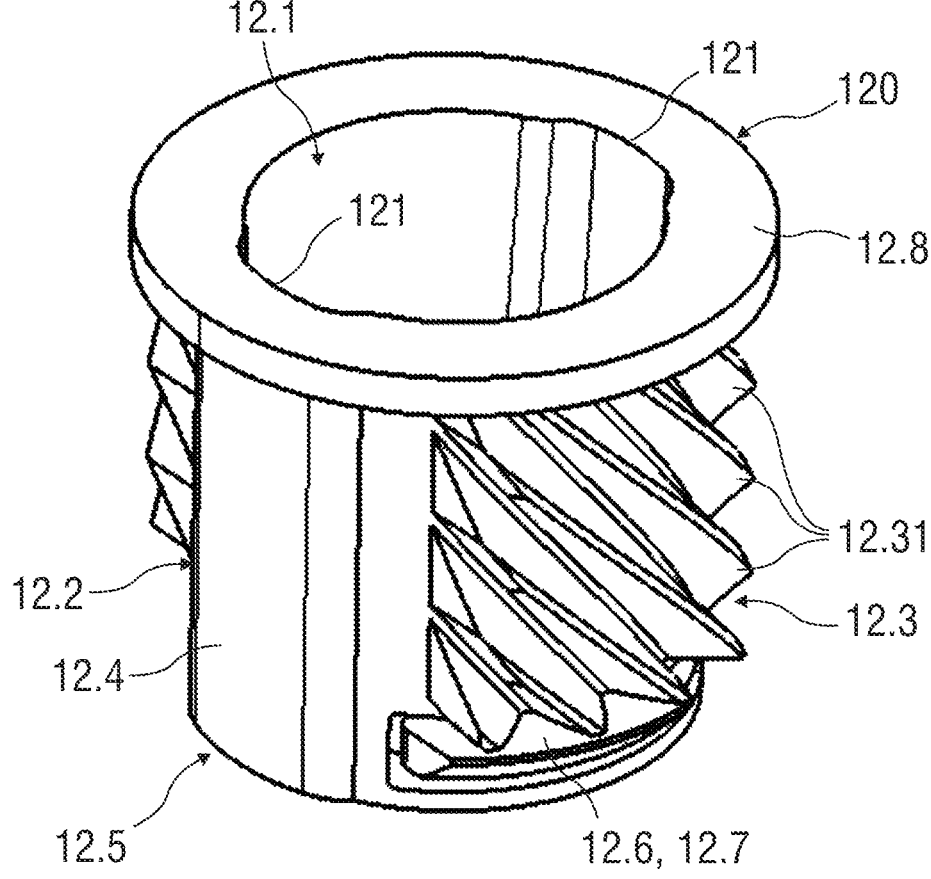
Figure 12:
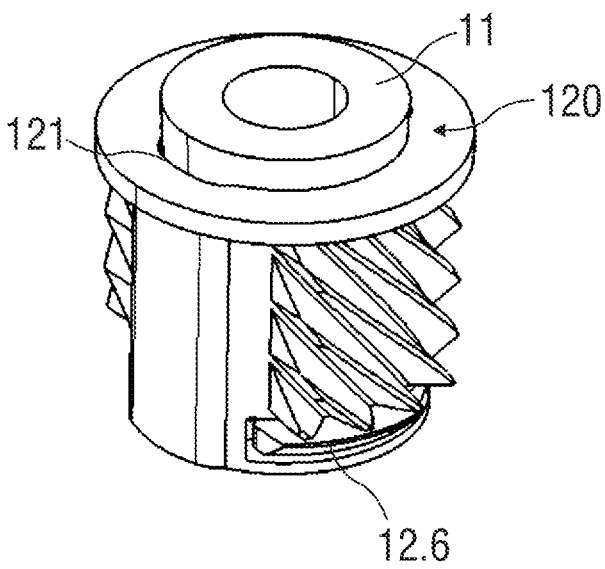
Figure 13:
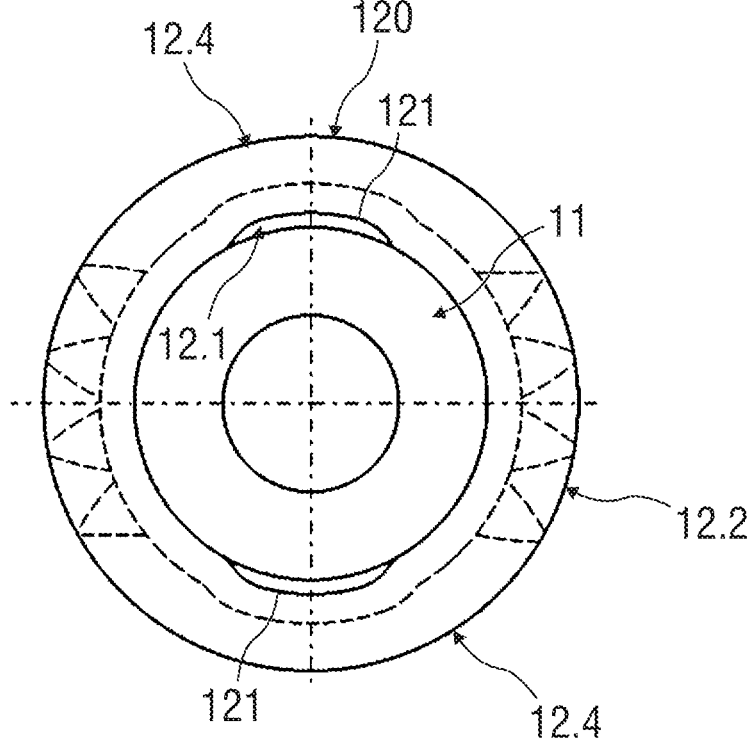
Figure 14:
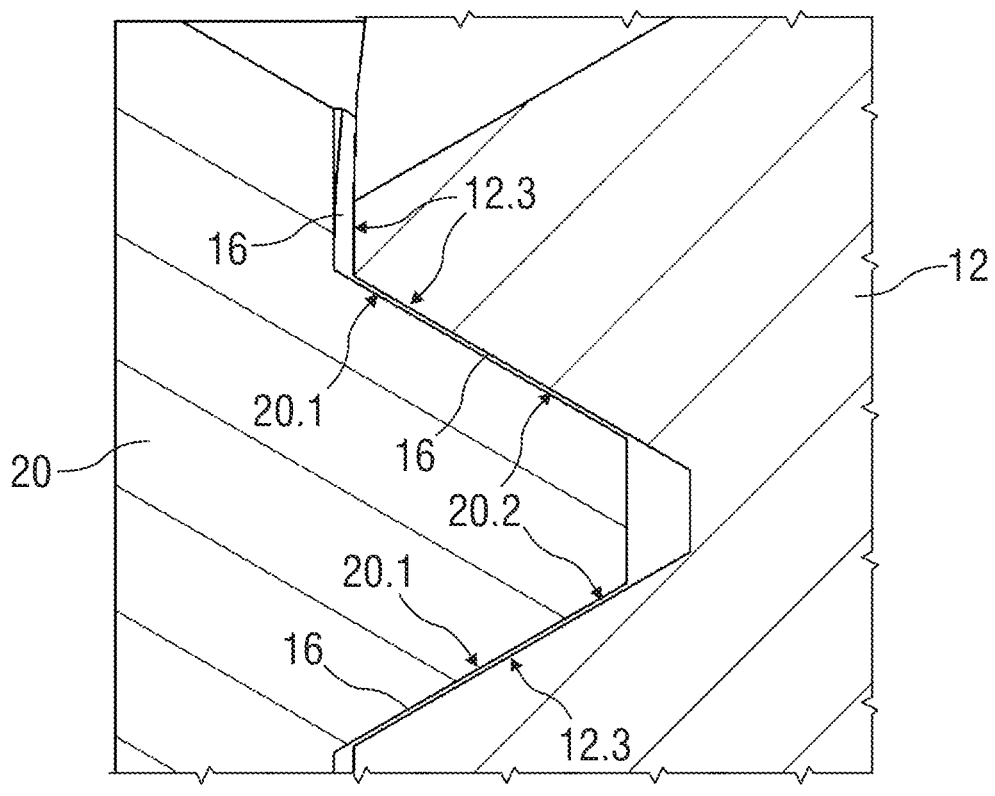
Figure 15:
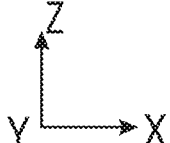
Figure 16:
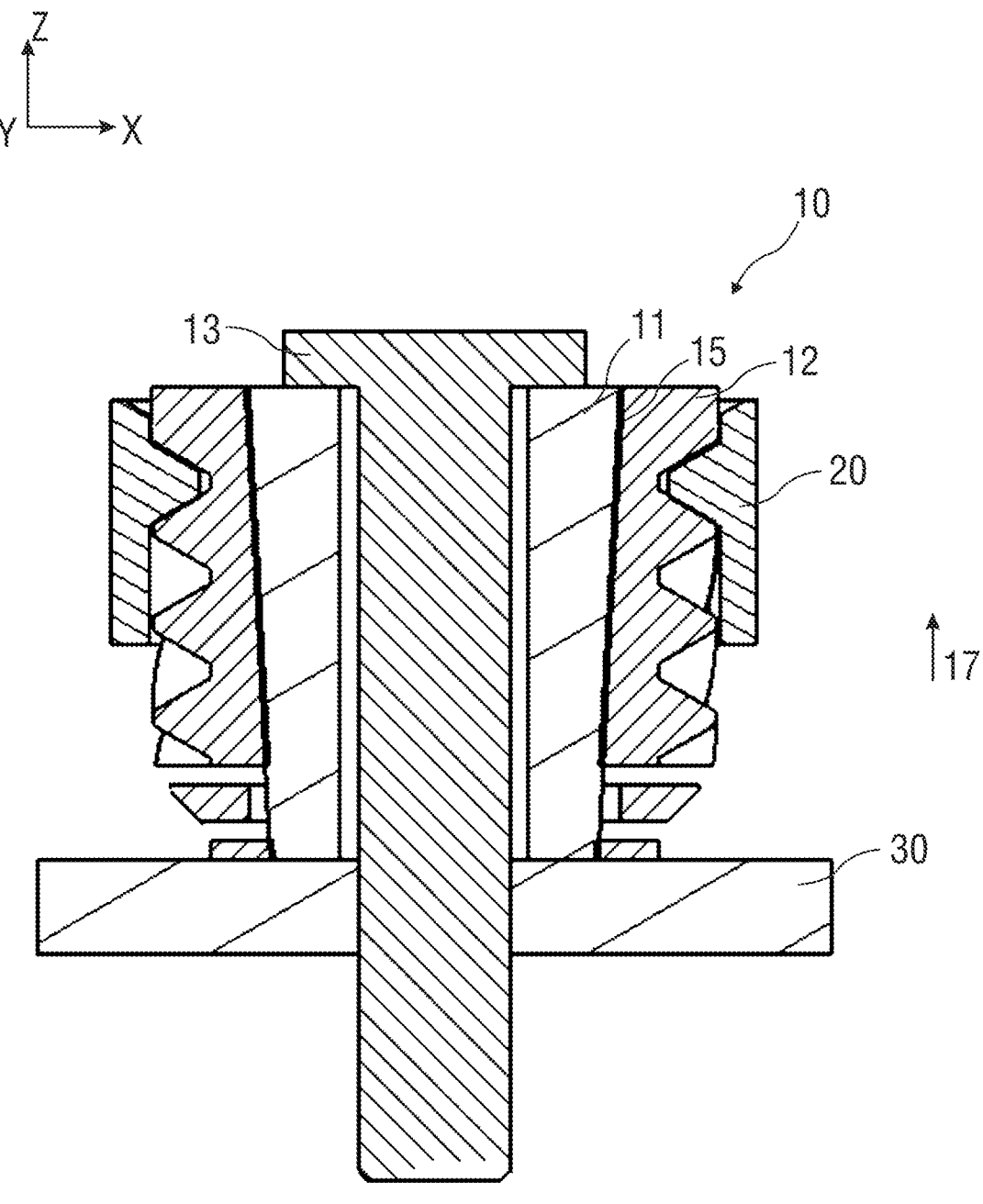
Figure 17:
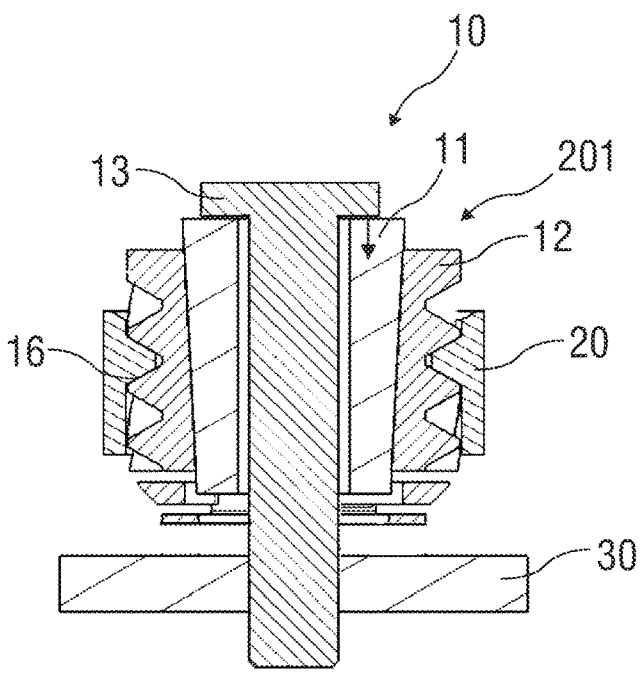
Figure 18:
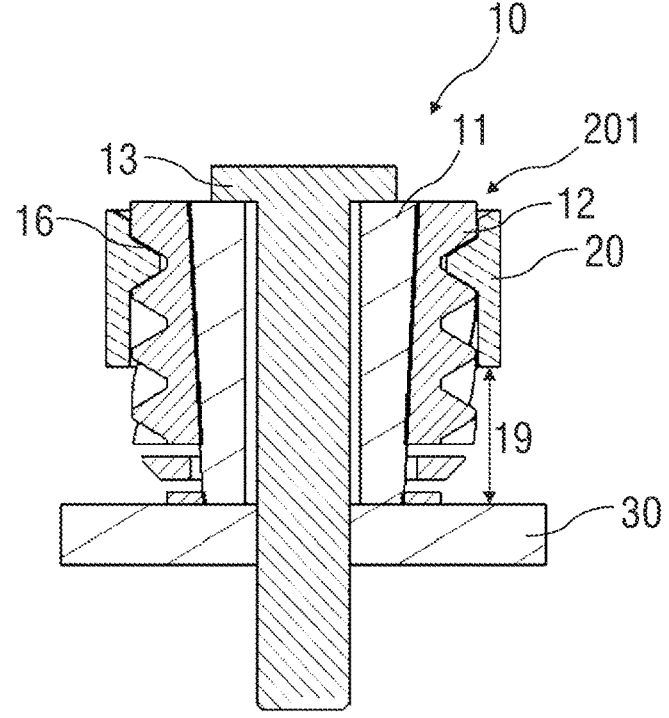
Figure 19:
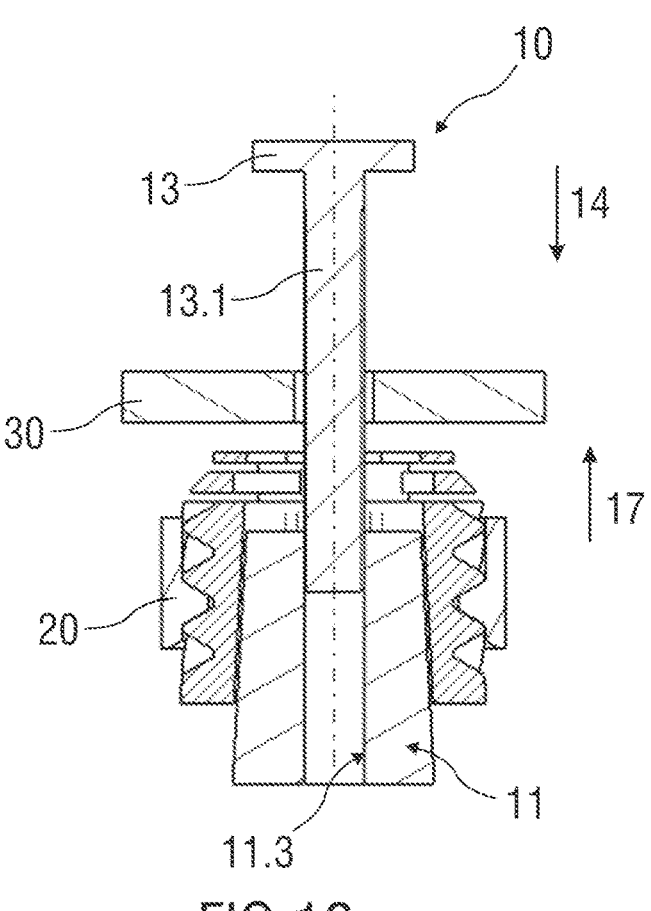
Figure 20:
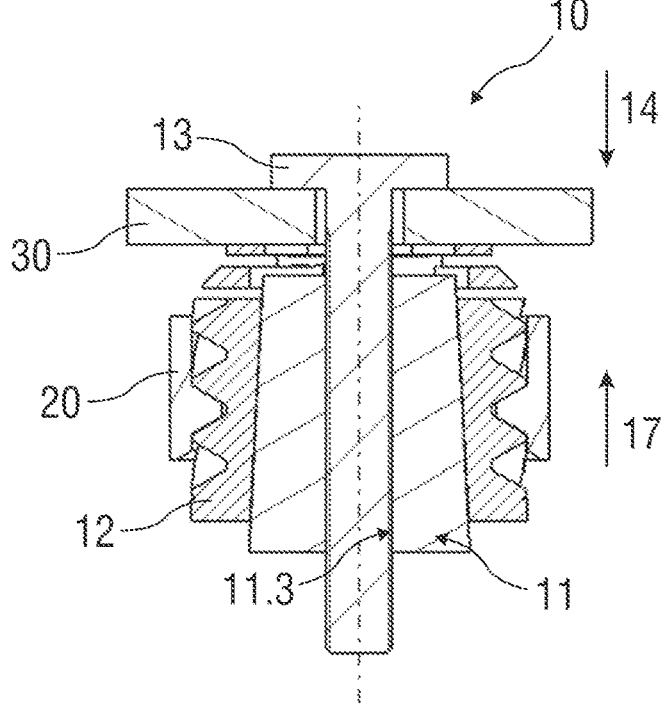
Figure 21:
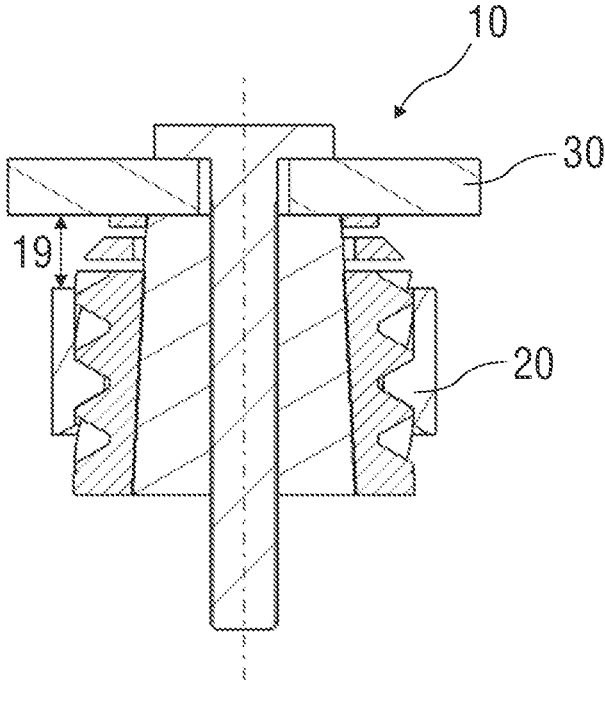
Figure 22:
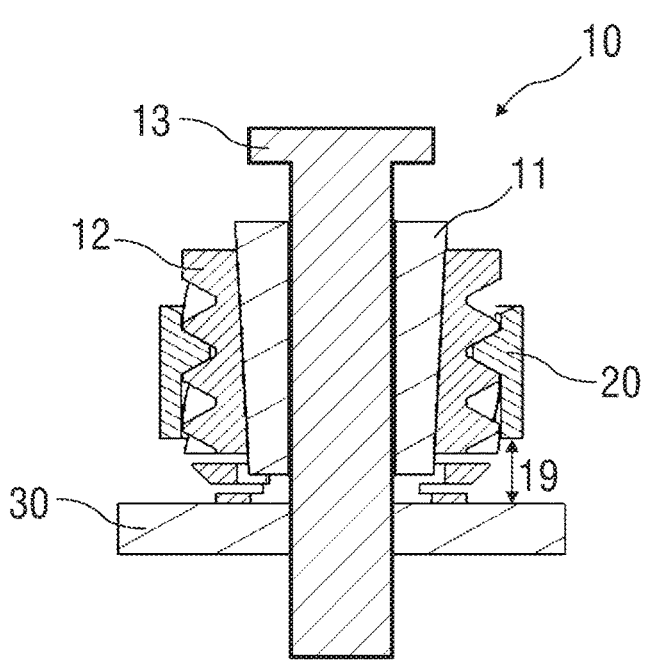
Figure 23:
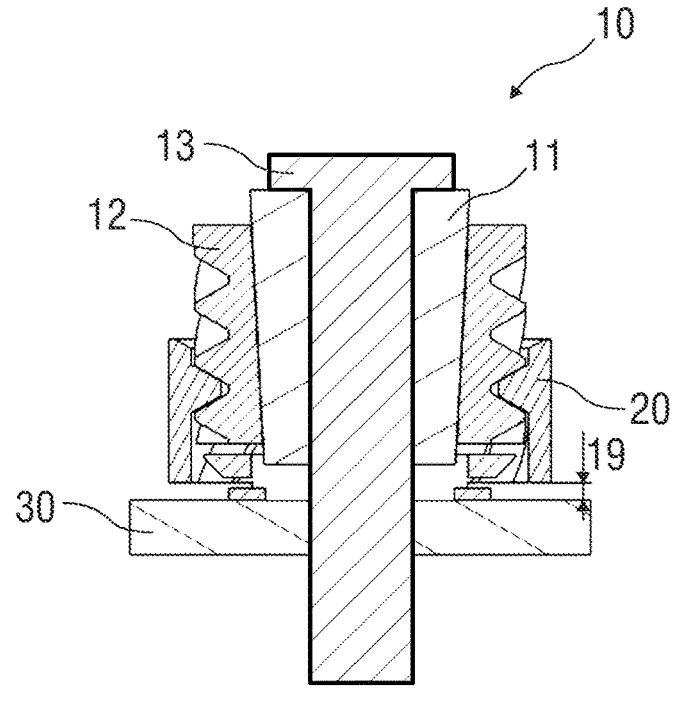
Figure 24:
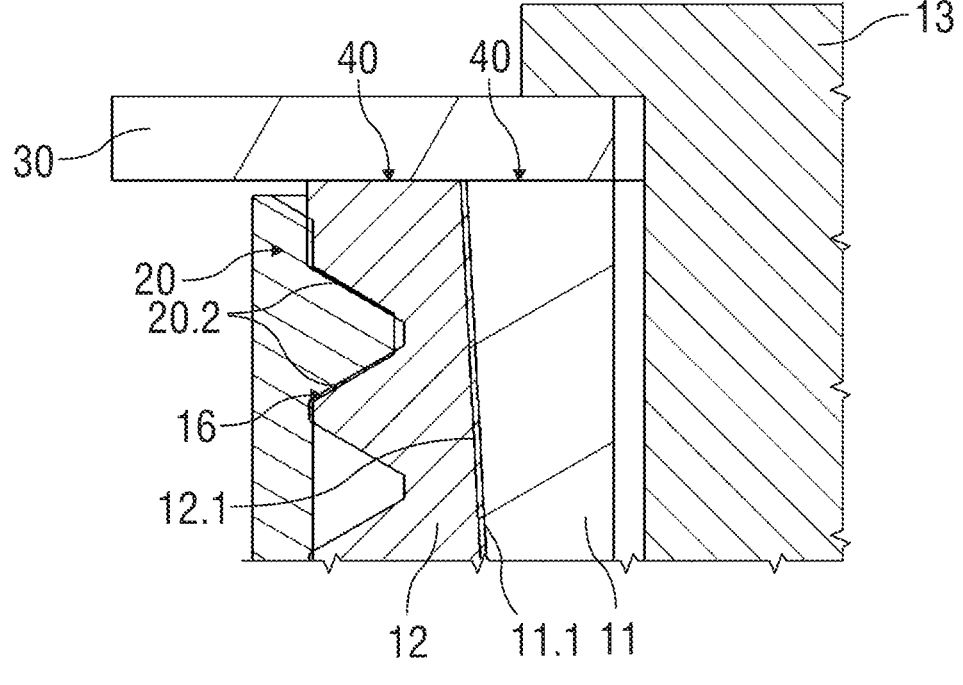
Figure 25:
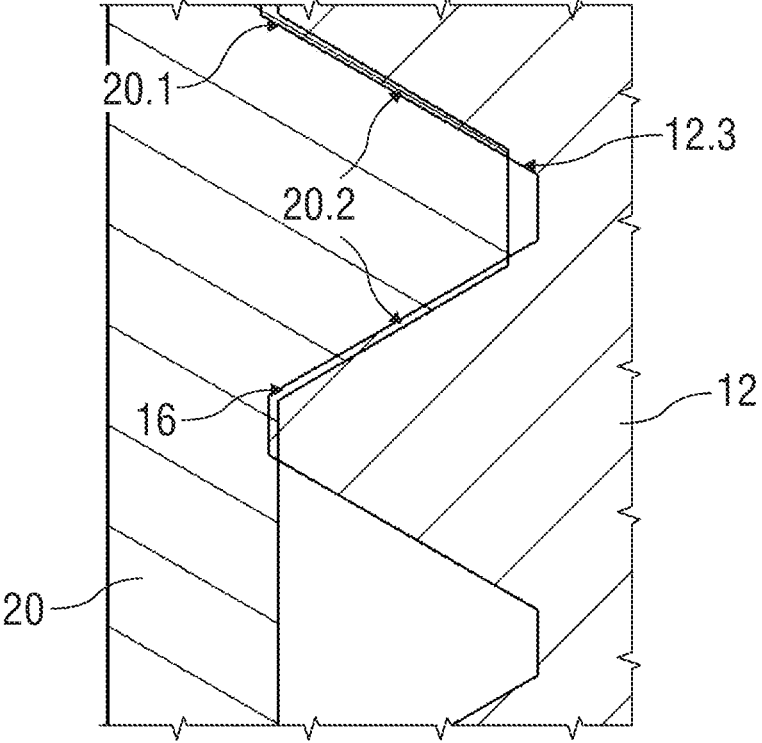
Figure 26:
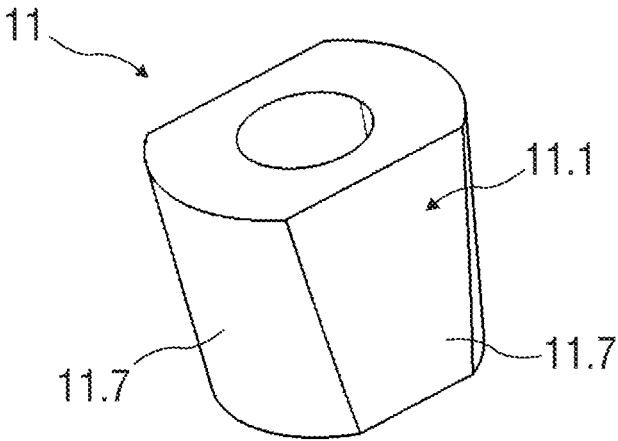
Figure 27:
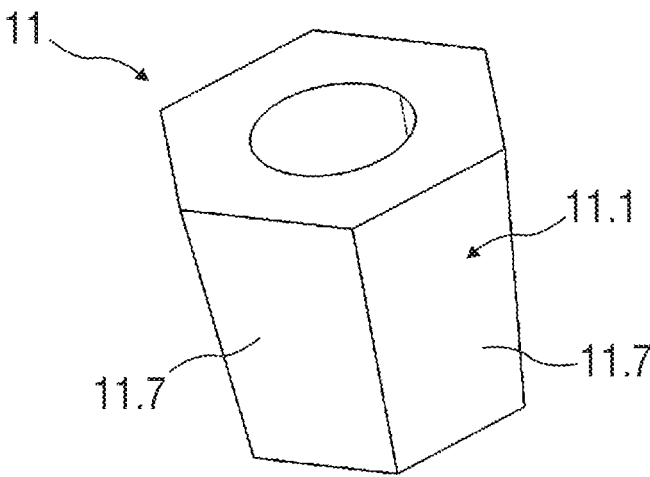
Figure 28:
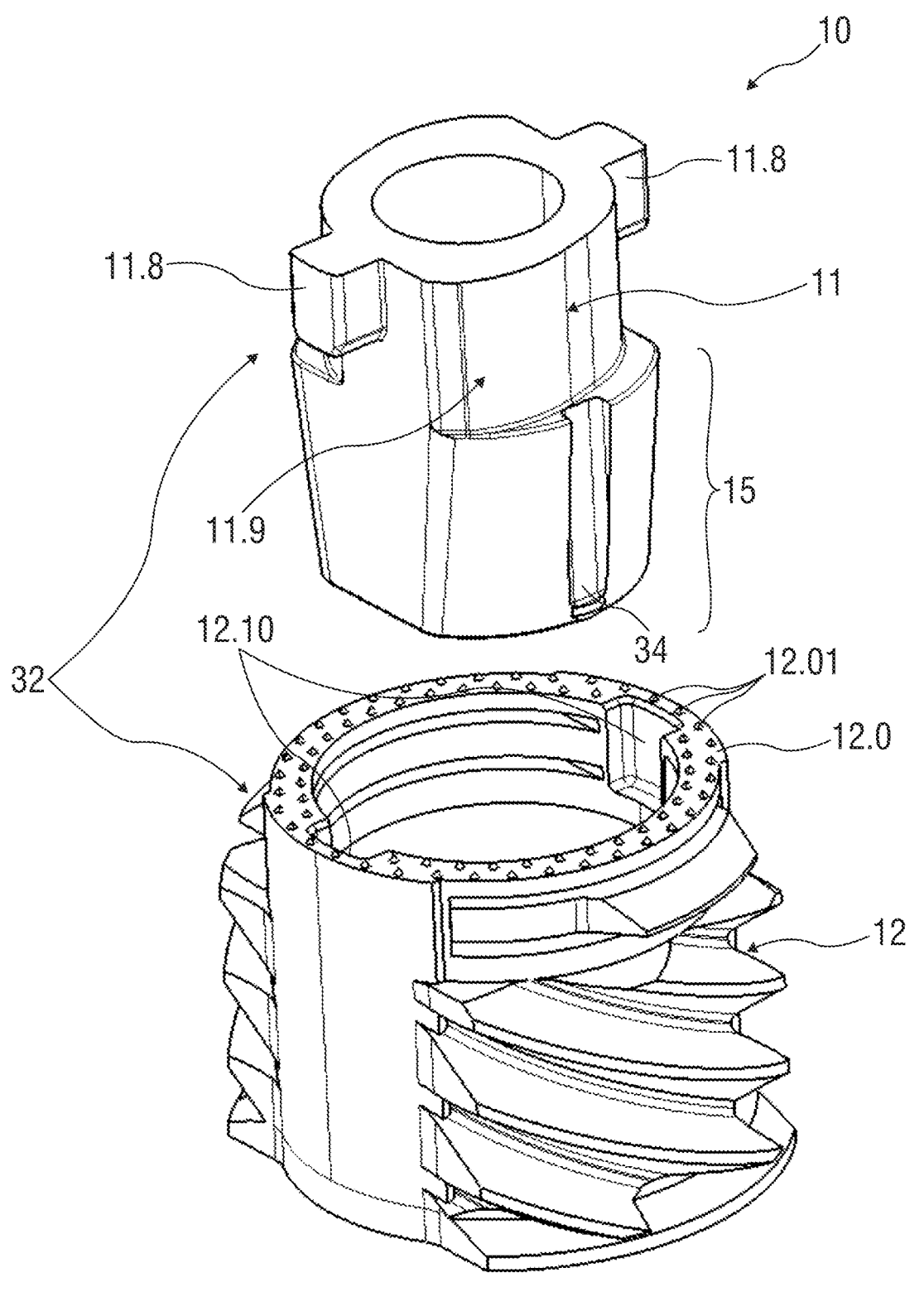
Figures 29, 29A:
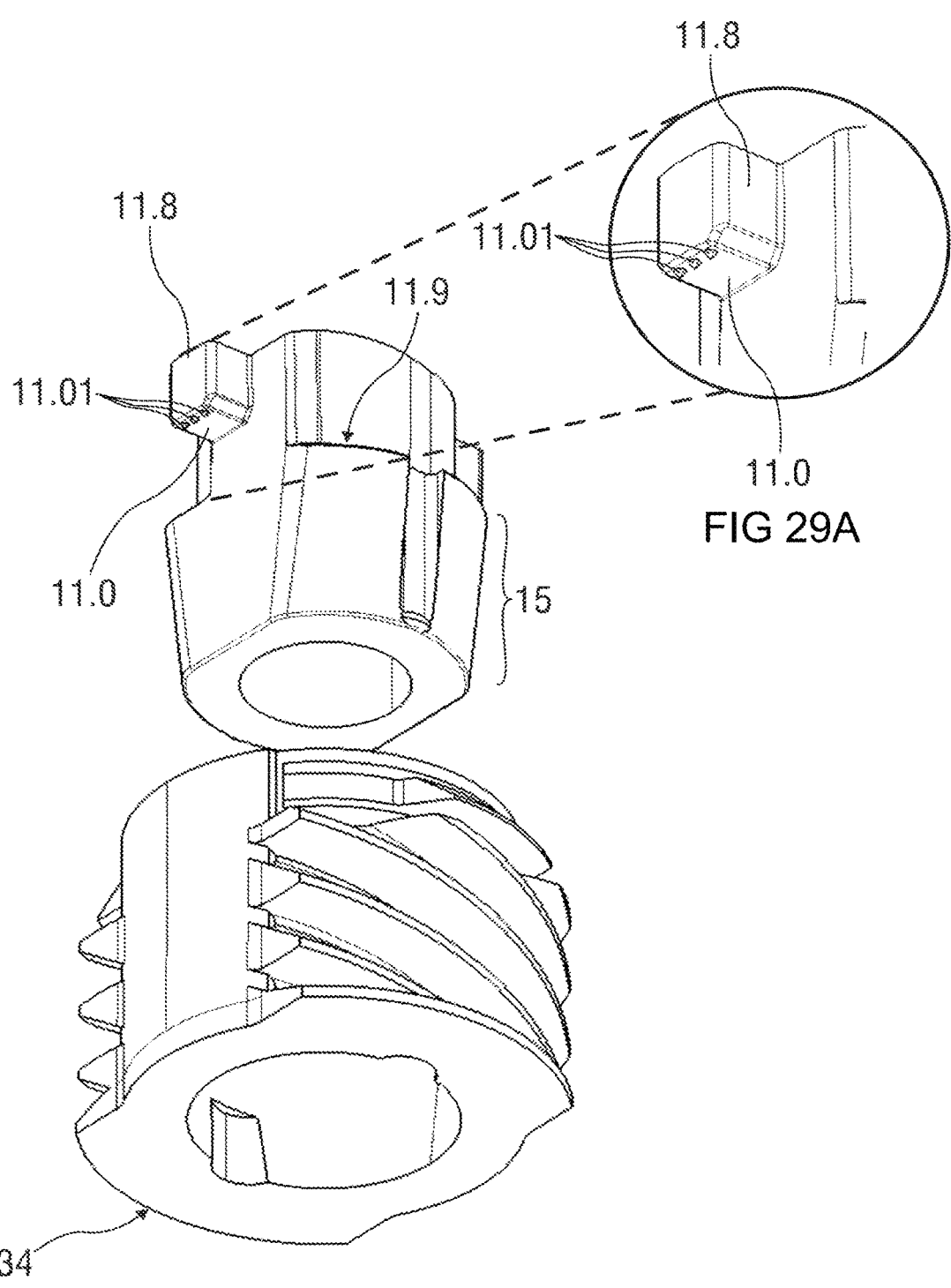

FIG. 4 schematically shows, in a perspective presentation, an example of a compensating element, FIG. 5 schematically shows, in a further perspective presentation, the example of the compensating element according to FIG. 4, FIG. 6 schematically shows, in a perspective presentation, an example of a component, FIG. 7 schematically shows, in a perspective presentation, an example of a device for compensating for tolerances in the fitted-together state without connecting element and pre-mounted on one of the components and prior to assembly with a further component, FIG. 8 schematically shows, in a further perspective presentation, an example of a device for compensating for tolerances in the fitted-together state without connecting element and pre-mounted on one of the components and prior to assembly with a further component, FIG. 9 schematically shows, in a further perspective presentation, the example for the device for compensating for tolerances in the fitted-together state without a connecting element and pre-mounted on one of the components and prior to assembly with a further component, FIG. 10 schematically shows, in a perspective presentation, an example of a component, FIG. 11 schematically shows, in a perspective presentation, a further example of a compensating element with expansion regions, FIG. 12 schematically shows, in a further perspective presentation, the further example of the compensating element with expansion regions according to FIG. 11 and with inserted base element, FIG. 13 schematically shows, in a plan view, the further example of the compensating element with expansion regions according to FIG. 11 and with the base element inserted, FIG. 14 schematically shows, in a sectional presentation, an enlarged detail of an interface region of a compensating element inserted in a component, FIG. 15 schematically shows, in a sectional presentation, a first exemplary embodiment of a device for compensating for tolerances between two components to be connected to one another, in a pre-mounted state, FIG. 16 schematically shows, in a sectional presentation, the first exemplary embodiment of the device according to FIG. 15 after assembly and in the mounted state, FIG. 17 schematically shows, in a sectional presentation, a second exemplary embodiment of a device for compensating for tolerances between two components to be connected to one another in a partially mounted state, FIG. 18 schematically shows, in a sectional presentation, the second exemplary embodiment of the device according to FIG. 17 after assembly, FIG. 19 schematically shows, in a sectional presentation, a third exemplary embodiment of a device for compensating for tolerances between two components to be connected to one another, in a pre-mounted state, FIG. 20 schematically shows, in a sectional presentation, the third exemplary embodiment of the device according to FIG. 19 after a partial assembly and in a partially mounted state, FIG. 21 schematically shows, in a sectional presentation, the third exemplary embodiment of the device according to FIG. 19 after assembly and in the mounted state, FIG. 22 schematically shows, in a sectional presentation, a fourth exemplary embodiment of a device for compensating for tolerances between two components to be connected to one another, in a partially mounted state, FIG. 23 schematically shows, in a sectional presentation, the fourth exemplary embodiment of the device according to FIG. 22 after assembly, FIG. 24 schematically shows, in a sectional presentation, an enlarged detail of interface regions of a mounted device, FIG. 25 schematically shows, in a sectional presentation, an enlarged detail of an interface region of a compensating element inserted in a component, FIG. 26 schematically shows, in a perspective presentation, a further exemplary embodiment of a changing outer shape of the base element, FIG. 27 schematically shows, in a perspective presentation, a further exemplary embodiment of a changing outer shape of the base element, FIG. 28 schematically shows, in a perspective presentation, a fifth exemplary embodiment of a device for compensating for tolerances between two components to be connected to one another, FIGS. 29 and 29A schematically show, in further perspective presentation, the fifth exemplary embodiment of the device for compensating for tolerances between two components to be connected to one another.

Figure 30:
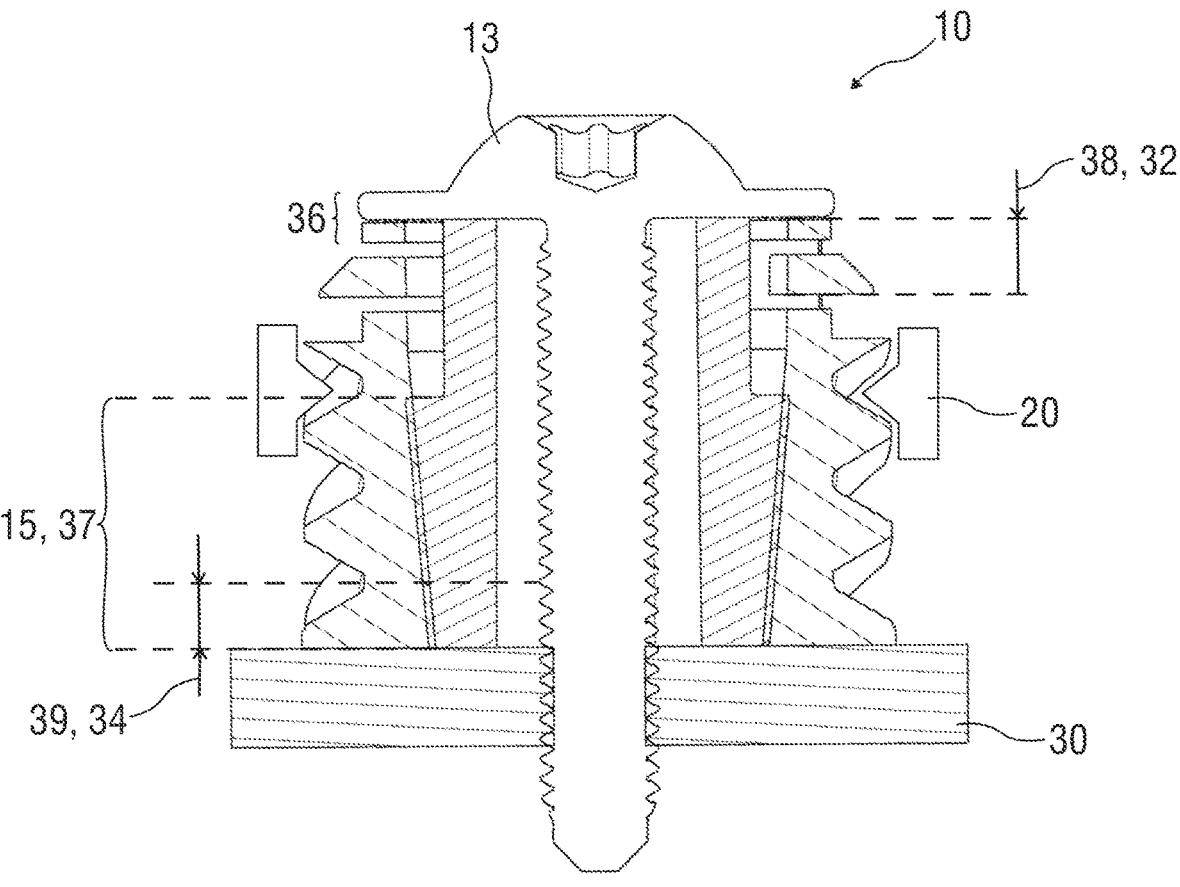
Figure 31:
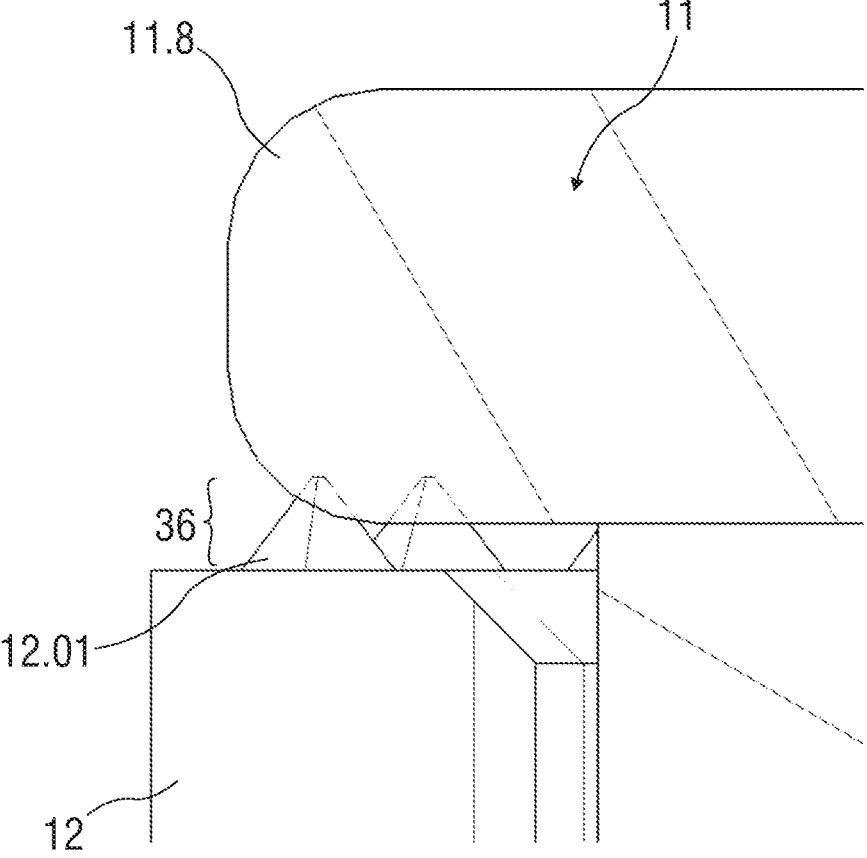
Figure 32:
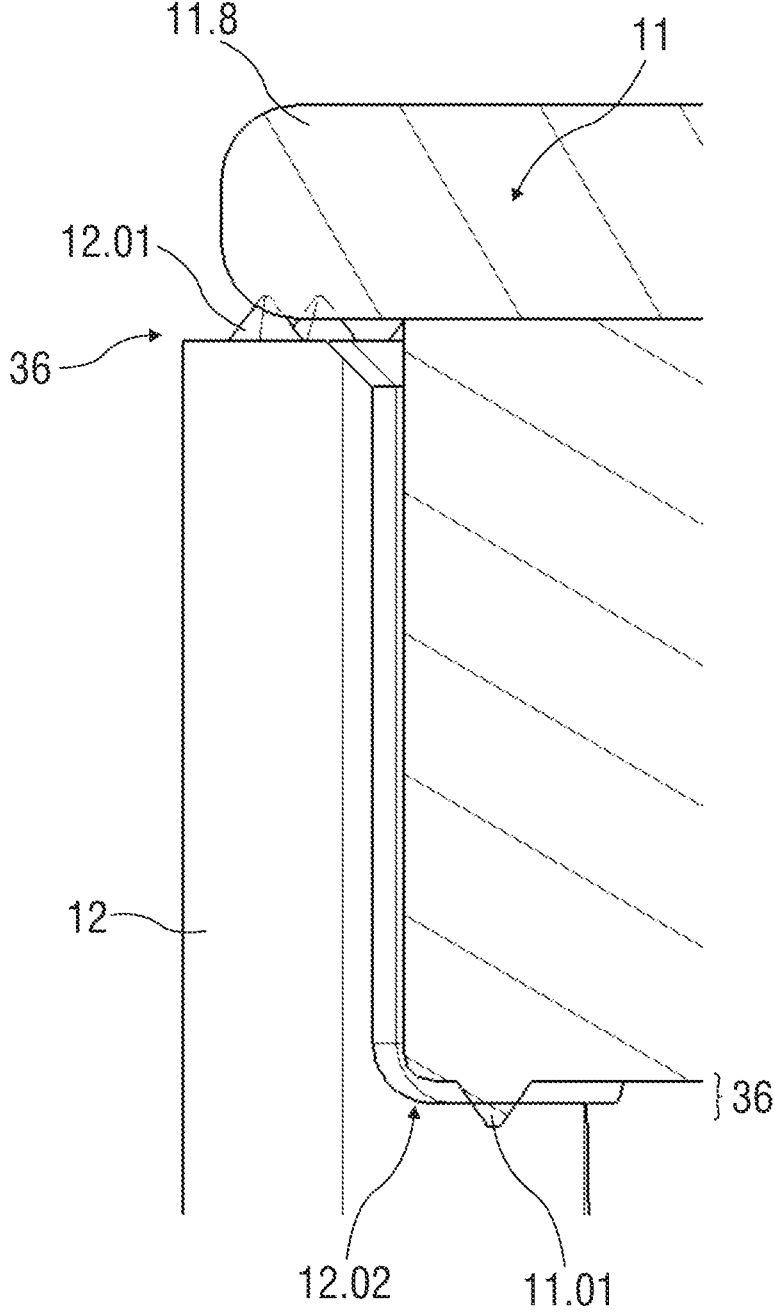
Figures 33, 34, 34A:
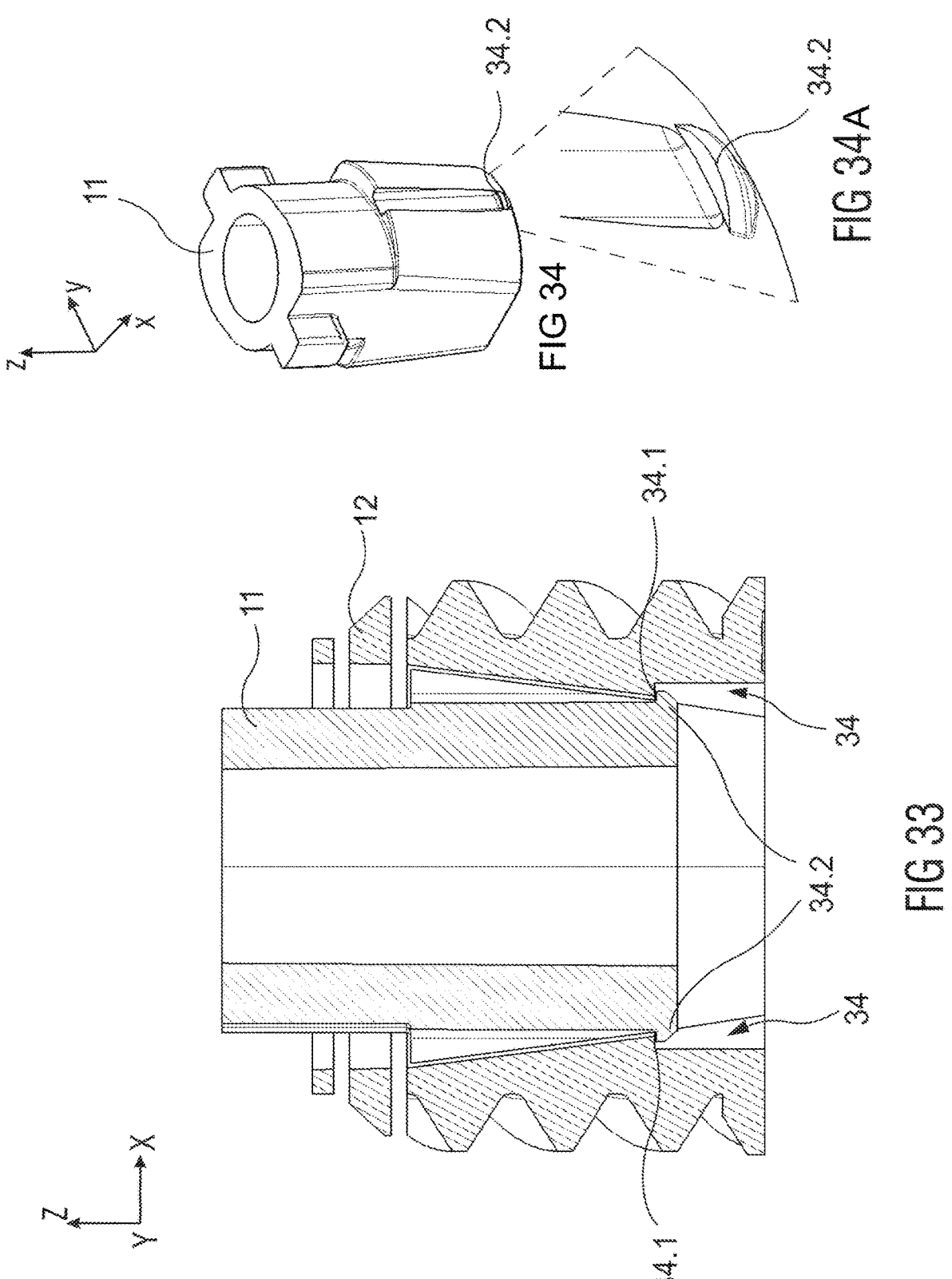
Figure 35:
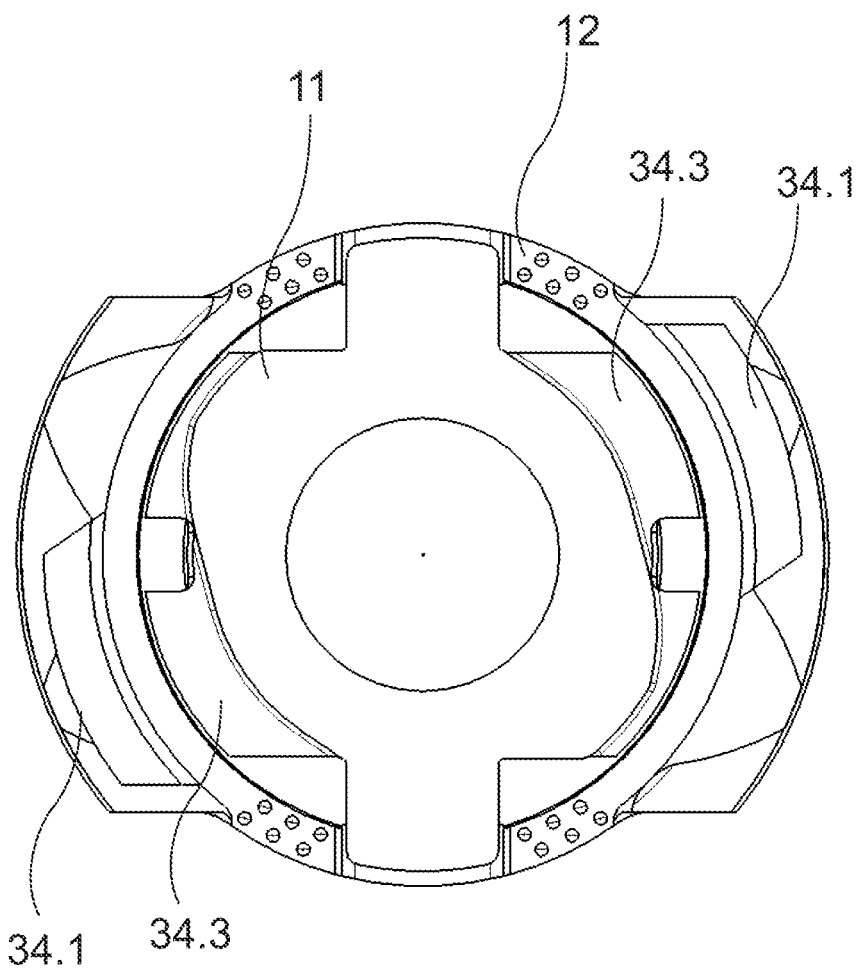

FIG. 30 schematically shows, in a sectional presentation, the fifth exemplary embodiment of the device for compensating for tolerances between two components to be connected to one another in a mounted state, FIG. 31 schematically shows, in an enlarged sectional presentation, the fifth exemplary embodiment in the region of a coupling interface for play-free axial clamping, FIG. 32 schematically shows, in an enlarged sectional presentation, the fifth exemplary embodiment in a region of a further coupling interface for play-free axial clamping, FIG. 33 schematically shows, in a sectional presentation, a pre-latching between the base element and the compensating element for captive transport, FIGS. 34 and 34A schematically show, in a perspective presentation, a latching clip on the base element for the pre-latching, and FIG. 34A schematically shows, in a perspective presentation, a detailed view of a latching clip on the base element for the pre-latching, and FIG. 35 schematically shows a bottom view of the base element and compensating element with a free space for pushing in a transport securing means.

DETAILED DESCRIPTION

Parts corresponding to one another are provided with the same reference signs in all the drawings.

Figure 1:
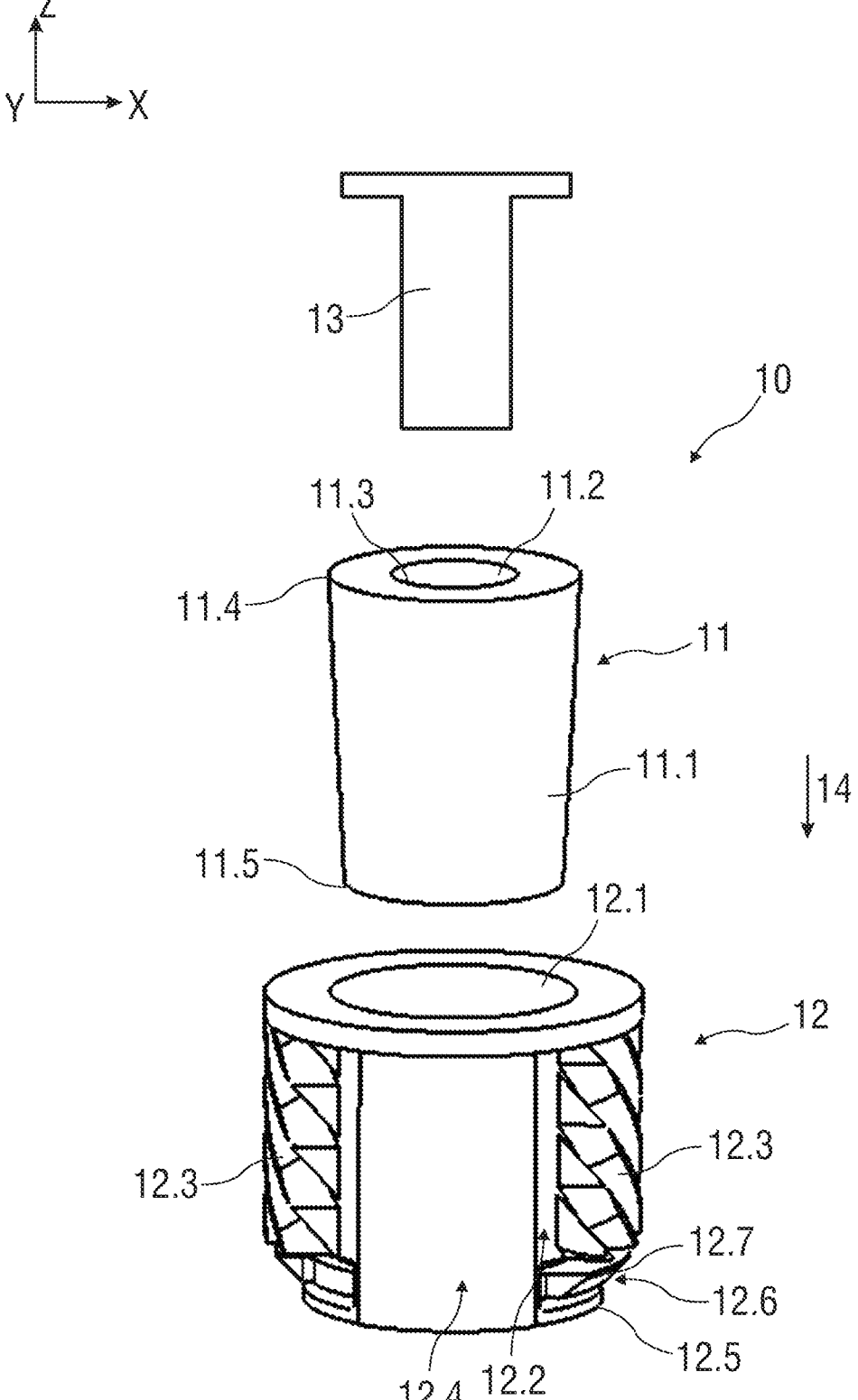
FIG. 1 schematically shows, in an exploded presentation, an exemplary embodiment of a device for compensating for tolerances, FIG. 2 schematically shows, in a sectional presentation, the device for compensating for tolerances according to FIG. 1 in the fitted-together state without connecting element and before assembly, FIG. 3 schematically shows, in a perspective presentation, the device for compensating for tolerances according to FIG. 2 in the fitted-together state without connecting element and before assembly.

FIG. 1 schematically shows, in an exploded presentation, an exemplary embodiment of a device 10 for compensating for tolerances, in particular vertical or axial tolerances, in particular a height gap or a synchronization height.

The device 10 comprises at least a, in particular hollow-cylindrical, base element 11 and a, in particular hollow-cylindrical, compensating element 12, which can be inserted into the base element 11 before the device 10 is assembled.

Furthermore, the device 10 comprises a connecting element 13, which can be inserted into the base element 11, in particular in an installation direction or insertion direction 14, before or during assembly of the device 10 and can be inserted through the base element 11.

When assembling the device 10, the connecting element 13, for example a connecting bolt or a connecting screw, comes into engagement with the base element 11. The connecting element 13 has a cylindrical outer shape.

The connecting element 13 can be formed without a thread or with a thread. The connecting element 13 can be provided with a coating or a profile or a structure which is suitable for supporting the engagement with the base element 11.

The base element 11 can have, on its cylindrical inner shape 11.2, a thread, profile or structure corresponding to the thread, profile or structure, respectively, of the shaft of the connecting element 13.

The base element 11 can, for example, engage in the compensating element 12 in a force-fitting manner, in particular by frictional engagement, or in a form-fitting manner, in such a manner that the compensating element 12 comes into play-free, play-reduced and/or self-locking engagement with a first component 20 (shown in FIGS. 6 to 10 and 14 to 23).

Such a play-free, play-reduced and/or self-locking engagement of the compensating element 12 with the first component 20 (shown in FIGS. 6 to 10 and 14 to 23) produced during assembly of the device 10 allows an automatic tolerance compensation with slight action of a lifting force.

The compensating element 12 can be formed, for example, from a metal, a metal alloy or a plastics material. The base element 11 can be formed, for example, from a metal, a metal alloy or a plastics material.

The base element 11 has, for example, a changing outer shape 11.1 and a cylindrical inner shape 11.2. In the case of a connecting element 13 designed as a connecting screw, the base element 11 can have an inner thread 11.3.

The changing outer shape 11.1 allows, in a particularly simple way, a force-fitting or form-fitting engagement of the base element 11 with the compensating element 12, in particular a force-fit connection 15, for example a wedged engagement for rotary entrainment.

The outer shape 11.1 can have, for example, a geometry that changes in portions, as shown in further examples in FIGS. 25 and 26.

The base element 11 can have, for example, an outer shape 11.1, which is at least partially tapering, in particular at least partially tapering in longitudinal extent, and the cylindrical inner shape 11.2.

The outer shape 11.1 can, for example, taper or narrow in longitudinal extent, in particular in the longitudinal direction x, from an upper end 11.4 of the base element 11 towards a center line or towards a lower end 11.5 of the base element 11, in particular steadily. The outer shape 11.1 can be widened or enlarged, for example, at the upper end 11.4 and can be tapered at the lower end 11.5.

In particular, the base element 11 has, at least in portions, a conical outer shape 11.1. The conical outer shape 11.1 allows a force-fitting engagement of the base element 11 with the compensating element 12, in particular a wedged engagement for rotary entrainment, in a simple manner.

The compensating element 12 has, for example, an inner shape 12.1, in particular cylindrical or conical, corresponding to the outer shape 11.1, and a cylindrical outer shape 12.2 with one or more threaded outer portions 12.3 and one or more thread-free outer portions 12.4.

Figure 2:
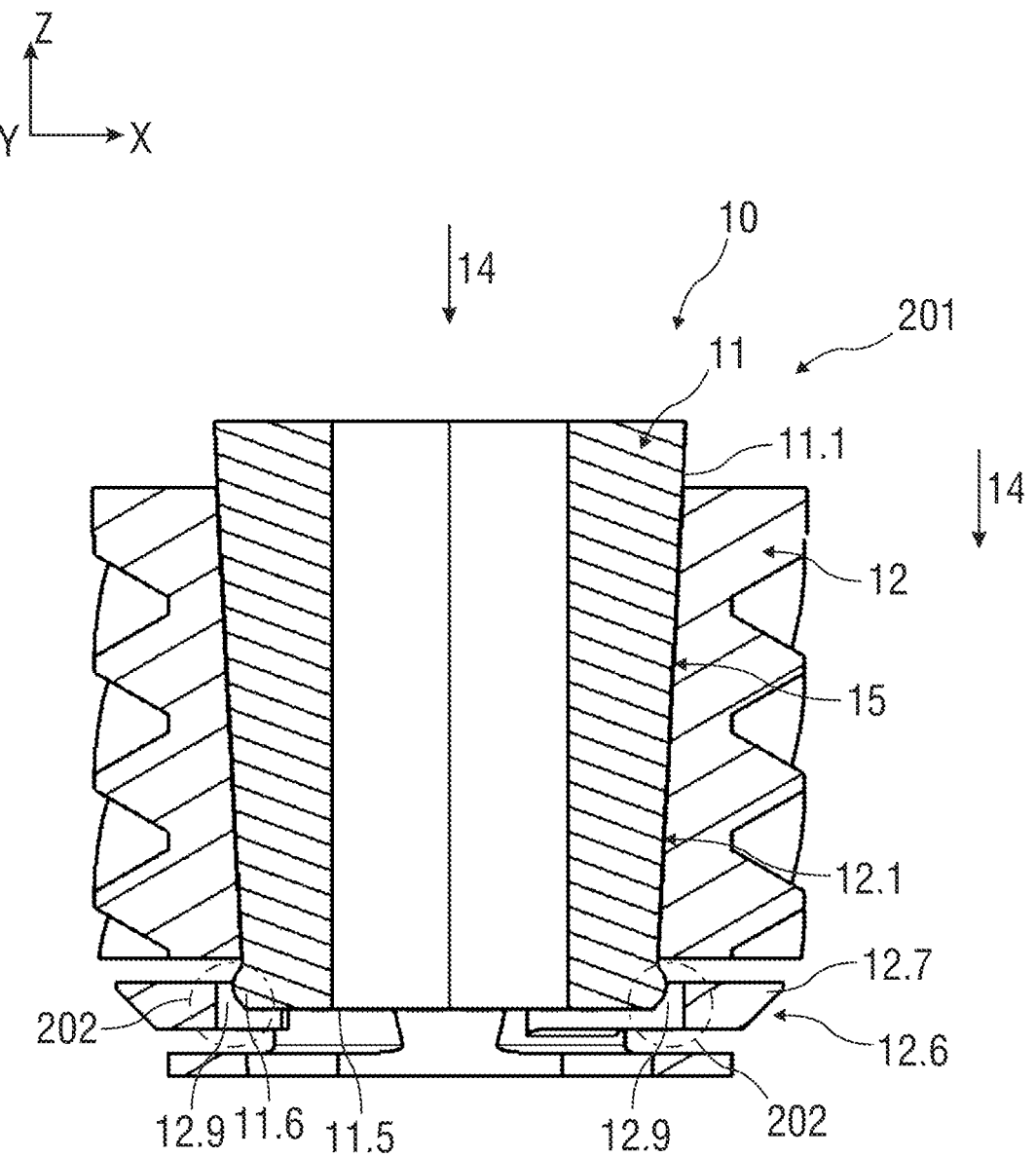

A conical inner shape 12.1 of the compensating element 12 runs in particular in the same direction, in particular in the installation direction or insertion direction 14, conically relative to the conical outer shape 11.1 of the base element 11, as shown in FIG. 2 in an exemplary manner.

In addition, the compensating element 12 can comprise, at one of its longitudinal ends 12.5, a transport securing means 12.6 for securing the compensating element 12 in the first component 20 (shown in FIGS. 6 to 10 and 14 to 23) during transport and before the assembly of the device 10. For example, the transport securing means 12.6 can be designed as a molding 12.7 projecting radially from the outer circumference of the compensating element 12. By way of example, the molding 12.7 is designed as an annular rib or as circular segment-shaped rib portions.

The device 10 allows, in a simple manner, to perform an automatic tolerance compensation between at least two components 20 and 30 to be connected (shown in FIGS. 15 to 23) which is activatable via the connecting element 13, as will be described in greater detail below.

FIG. 2 schematically shows a sectional presentation of the device 10 for compensating for tolerances according to FIG. 1 in the partially mounted state without a connecting element 13 (shown in FIG. 1) and prior to complete assembly of the device 10.

The base element 11 is inserted into the compensating element 12. For the automatic tolerance compensation, a cone principle is used by way of example in a coupling interface, in particular the form-fit connection 15, between the base element 11 and the compensating element 12, which in turn is in threaded engagement with the first component 20 (shown in FIGS. 6 to 10 and 14 to 23).

The coupling interface, in particular the force-fit connection 15, can be formed by cone shapes running in the same direction of the base element 11 and compensating element 12, for example by wedging, in particular a conical wedging or a tornado wedging, between the base element 11 and the compensating element 12. Alternative geometries are shown in FIGS. 25 and 26.

For example, the base element 11 has an outer shape 11.1, in particular conical, tapering in the direction of its lower end 11.5. The compensating element 12 also has a conical inner shape 12.1 of the compensating element 12, which in particular runs in the same direction, in particular in the installation direction or insertion direction 14, conically to the conical outer shape 11.1 of the base element 11.

FIG. 2 shows the base element 11 and the compensating element 12 in a partially mounted state to form a pre-assembly unit 201. The pre-assembly unit 201 formed of compensating element 12 and base element 11 can be pre-mounted in the first component 20, as shown for example in FIGS. 15, 17, 19 and 22.

The base element 11 and the compensating element 12 are connectable via a pre-connection 202, for example via a latching, to form the pre-assembly unit 201. In this pre-mounted state, the base element 11 and the compensating element 12, in particular the corresponding outer shape 11.1 and the inner shape 12.1, are not yet connected to one another in a force-fitting manner, in particular are not yet wedged together.

For example, the base element 11 can have a retaining edge or retaining bead 11.6, in particular circumferential, at its tapered lower end 11.5. The compensating element 12 can, for example, have a retaining receptacle or retaining groove 12.9 corresponding to the retaining edge or retaining bead 11.6.

The threaded engagement between the compensating element 12 and the first component 20 (shown in FIGS. 6 to 10 and 14 to 23) is not secured self-lockingly. Only after the connecting element 13 (shown in FIG. 1) has been screwed into the base element 11 with the conical outer shape 11.1 is the base element 11 pressed into the compensating element 12 and thus the position of the compensating element 12 relative to the base element 11 arrested. In particular, the compensating element 12 and the base element 11 are arranged relative to one another play-free or at least with reduced play.

In this case, the form-fit connection 15, in particular a frictionally engaged connection or wedged connection, or a form-fitting connection is produced. The base element 11 and the compensating element 12 are in a force-fitting engagement—the form-fit connection 15—for example in a wedged engagement for rotary entrainment.

At the same time, the subassembly or pre-assembly unit 201, formed from the compensating element 12 and the base element 11, is pressed into the first component 20 and automatically comes into self-locking engagement with the first component 20 (shown in FIGS. 6 to 10 and 14 to 23).

The transport securing means 12.6 is integrated in, in particular integrally formed or molded on, the compensating element 12. The transport securing means 12.6, for example in the form of the radially outwardly projecting molding 12.7, holds the compensating element 12 in position relative to the first component 20 during transport (shown in FIGS. 6 to 10 and 14 to 23).

Unlike with known tolerance compensation devices, the compensating element 12 is not moved out of the base element 11 counter to the insertion direction 14 of the connecting element 13, but the base element 11 is moved into the compensating element 12 in an insertion direction 14 of the connecting element 13. In the device 10 according to the invention, no direct torque is thus transmitted from the connecting element 13 to the compensating element 12.

In order to achieve the tolerance compensation, a radial force is then exerted on the compensating element 12 with further insertion of the base element 11 into the compensating element 12 as a result of the generated force-fit connection 15, in particular the wedged connection, between the base element 11 and the compensating element 12, as a result of which the compensating element comes into self-locking engagement with the first component 20, so that the compensating element moves the first component 20 against the insertion direction 14 in a compensating direction 17, as is shown and described below, for example, by the sequence of FIGS. 15 and 16 or 17 and 18 or 19 to 21 or 23 and 24.

Figure 3:
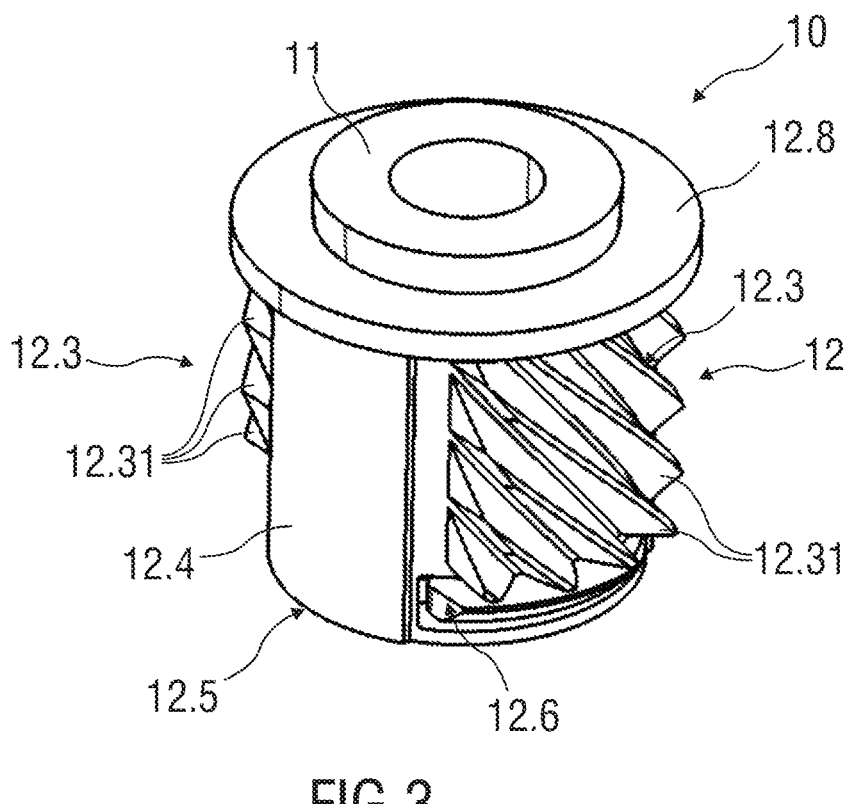

FIG. 3 schematically shows, in a perspective presentation, the device 10 for compensating for tolerances according to FIG. 2 in the assembled state without connecting element 13 and before assembly. The base element 11 projects beyond a flange 12.8 of the compensating element 12.

The thread-free outer portion 12.4 extends below the flange 12.8 over the entire length of the compensating element 12 and thus also over the portion at the longitudinal end 12.5 where the transport securing means 12.6 is integrated in portions, for example in the form of a circular segment.

The threaded outer portion 12.3 has a plurality of external thread portions 12.31.

On the outer side of the compensating element 12, for example, two groups of external thread portions 12.31 running parallel to one another are formed in each case in the circumferential direction. A group of external thread pitch portions 12.31 is provided on each hollow cylinder half of the compensating element 12. The external thread pitch portions 12.31 are designed in such a manner that they form a multi-pitch threaded outer portion 12.3 of the compensating element 12. In this case, the pitch of the external thread pitch portions 12.31 of the compensating element 12 can be adapted to the pitch of an internal thread 20.1 with internal thread pitch portions 20.11 of the first component 20. For example, the external thread pitch portions 12.31 and the internal thread 20.1 form such a steep thread that the threaded engagement of the compensating element 12 and the first component 20 is non-self-locking and has a thread play 16 (shown in FIGS. 14, 24 and 25).

FIG. 4 shows the compensating element 12 with the inserted base element 11 in accordance with FIG. 3 in a further perspective presentation. The base element 11 projects beyond the upper flange 12.8. The base element 11 has approximately the same length as the compensating element 12, so that the inner shape 12.1 of the compensating element 12 can be seen at the lower longitudinal end 12.5.

FIG. 5 shows a further perspective presentation of the compensating element 12 with the inserted base element 11 according to FIG. 3.

The transport securing means 12.6 is, for example, only integrated on the compensating element 12 in the region of the threaded outer portions 12.3 below the latter at the lower longitudinal end 12.5, in particular as a molding 12.7, for example in the form of a rib.

FIG. 6 schematically shows a perspective presentation of an example of the first component 20 with its internal thread 20.1 with the internal thread pitch portions 20.11.

FIG. 7 schematically shows, in a perspective presentation, the example for the device 10 without connecting element 13 according to FIG. 3, pre-mounted on the first component 20 according to FIG. 6 and before assembly with the further component 30 (shown in FIGS. 15 to 20).

FIG. 8 schematically shows, in a further perspective presentation, the example for the device 10 without connecting element 13 according to FIG. 4, pre-mounted on the first component 20 according to FIG. 6 and before assembly with the further component 30 (shown in FIGS. 15 to 20).

In addition to the transport securing means 12.6 for securing the compensating element 12 in the first component 20, end stops 12.61 can be provided on the first component 20 and the compensating element 12, for example, which prevent a falling out at the upper end.

The transport securing means 12.6, in particular the formation 12.7, strikes against ends or thread teeth of the internal thread 20.1 of the first component 20 and thus prevents a falling out at the opposite end of the pre-assembly unit 201.

FIG. 9 schematically shows, in a further perspective presentation, the example of the device 10 without connecting element 13 according to FIG. 5, pre-mounted on the first component 20 according to FIG. 6 and before assembly with the further component 30 (shown in FIGS. 15 to 23).

FIG. 10 schematically shows, in a further perspective presentation, the example of the first component 20 according to FIG. 6.

FIG. 11 schematically shows, in a perspective presentation, a further example of a compensating element 120. Both the compensating element 12 and the compensating element 120 are at least partially deformable. For example, the compensating element 12, 120 can be formed from a plastics material.

The compensating element 120 differs from the above-described compensating element 12 in additional expansion regions 121. All above-described structural features, such as the inner shape 12.1, the outer shape 12.2, the threaded outer portions 12.3, the external thread pitch portions 12.31, the thread-free outer portions 12.4, the longitudinal end 12.5, the transport securing means 12.6, the molding 12.7 and the flange 12.8 as well as the described functions of the compensating element 12 apply analogously to the compensating element 120 with the additional expansion regions 121.

In order to improve the deformability of the compensating element 120, the inner shape 12.1 can have, for example, at least one or more of the expansion regions 121. For example, each expansion region 121 can be designed as a u-shaped or undulated widening in at least an inner region of the inner shape 12.1 of the compensating element 120. In this case, such an expansion region 121 is formed in particular in those regions which lie opposite thread-free outer portions 12.4 of the outer shape 12.2 of the compensating element 120.

FIG. 12 schematically shows, in a further perspective presentation, the further example of the compensating element 120 with the expansion regions 121 according to FIG. 11 and with inserted base element 11. The base element 11 is designed analogously to the previously described base element 11 according to FIGS. 1 to 10.

The deformability of the compensating element 120 during the final assembly of the device 10 with the components 20 and 30 (shown in FIGS. 15 to 23) is improved by means of the expansion regions 121. In particular, the expansion regions 121 ensure that there is sufficient space for the expansion when the conical base element 11 is inserted, in particular pressed, into the compensating element 120 during assembly.

For delivery or transport, the conical base element 11 and the compensating element 12 are joined without clamping. The delivery position or transport position is held and secured by means of the previously described transport securing means 12.6.

FIG. 13 schematically shows in plan view the further example of the compensating element 120 with the expansion regions 121 according to FIG. 11 and with inserted base element 11 according to FIG. 12.

Each expansion region 121 is integrated, in particular integrally formed, as a u-shaped or undulated extension in the inner shape 12.1 of the compensating element 120. In this case, the expansion regions 121 are integrated in those regions on the inner wall of the compensating element 120 which lie opposite the thread-free outer portions 12.4 of the outer shape 12.2 of the compensating element 120.

Alternatively, each expansion region 121 can be formed by two flattened sides on the conical base element 11.

FIG. 14 schematically shows, in a sectional presentation, an enlarged detail of an interface region of a compensating element 12 inserted in the first component 20. The interface region to the first component 20 applies analogously for the compensating element 120 according to FIGS. 11 to 13.

The threaded outer portions 12.3 and the corresponding internal thread 20.1 have such a steep thread, for example, that prior to assembly of the device 10, the thread play 16, in particular a radial clearance, is formed between the compensating element 12 and the first component 20, as already described above.

The threaded outer portions 12.3 of the compensating element 12 are deliberately selected so as to be steep in such a manner that, in the pre-mounted and not completely assembled state of the device 10, the compensating element lies outside the self-locking with the internal thread 20.1 of the first component 20. In order to displace the compensating element 12 into the first component 20 by the activation screw, the thread play 16 must be present between the compensating element 12 and the first component 20.

The pre-assembly unit 201 (shown in FIG. 2) is pre-mounted in the first component 20 (shown in FIG. 15).

During assembly, an axial compensation is initially carried out, as is described in greater detail with reference to the sequence of FIGS. 15 and 16 or 17 and 18 or 19 to 21 or 23 and 24.

In addition, during assembly, a pressure, in particular a radial pressure, is exerted by the connecting element 13 (shown in FIG. 15) via the force-fit connection 15 to the base element 11 to the compensating element 12 pre-mounted in the first component 20, in particular inserted with thread play 16. The compensating element 12 deforms radially and a thread, in particular the threaded outer portion 12.3, of the compensating element 12 engages radially in the counter-interface 20.2 of the first component 20, as a result of which the compensating element 12 and the first component 20 are fixable to one another without play, with reduced play and/or self-lockingly.

FIG. 15 schematically shows, in a sectional presentation, a first exemplary embodiment of the device 10 for compensating for tolerances between two components 20 and 30 to be connected to one another, in a pre-mounted state.

The device 10 serves to compensate for tolerances, in particular axial and/or radial, in particular a height gap and/or radial gap, between the two components 20 and 30 to be connected to one another. The device 10 is provided, for example, for attaching the first component 20, for example a bearing bracket, an electronic part, a lamp or a decorative part, to the further component 30, for example a door panel, a supporting structure or a body structure of a vehicle.

The base element 11 and the compensating element 12 can be pre-mounted to form the pre-assembly unit 201 and can be connected to one another, for example, by means of the pre-connection 202, in particular a latching (shown in FIG. 2).

In order to achieve the tolerance compensation, during assembly with the first component 20 and the further component 30, in particular during the further insertion of the base element 11 into the compensating element 12, as a result of the generated force-fit connection 15, in particular the wedge connection, between the base element 11 and the compensating element 12, initially an axial compensation is carried out in the compensation direction 17.

For example, the compensating element 12 comes into contact with the further component 30. Upon further insertion of the connecting element 13, the pre-assembly unit 201 formed of base element 11 and compensating element 13 moves axially relative to or in the first component 20, so that a desired distance between the first component 20 and the further component 30 is adjustable in a compensation direction 17, as is shown and described below, for example, by the sequence of FIGS. 15 and 16.

Furthermore, a radial force can be exerted on the compensating element 12, as a result of which the compensating element 12 comes into a play-free, play-reduced and/or self-locking, in particular fixing, engagement with the first component 20, so that the first component 20 is fixed in the set position after assembly, as is described in greater detail by way of example with reference to FIG. 14. In this case, the compensating element 12 compensates for a radial gap in that it can be deformed radially, in particular in the radial direction 18.

The compensating element 12 is mounted in the first component 20 via a threaded engagement and is used to carry out a tolerance compensation of the first component 20 relative to the further component 30 in the axial direction or compensation direction 16 (=z-direction) and/or a tolerance compensation between the compensating element 12 and the first component 20 in the radial direction 18.

The conical base element 11 can be formed from a hard plastic or metal. In addition, a mixture of a softer plastic in combination with metallic fractions can also be used as a material for the conical base element 11 in order to make the use of the conical outer shape 11.1 effective for wedging with the compensating element 12, in particular the inner shape 12.1.

During assembly, the conical base element 11 can be inserted into and moved further into the compensating element 12 and comes into the force-fit connection 15, in particular a wedged engagement or frictional engagement, with the compensating element 12. As a result, the compensating element 12 deforms in radial direction 18, whereby the threaded outer portions 12.3 of the compensating element 12 engage radially in a counter-interface 20.2 of the first component 20, in particular in the internal thread 20.1. The compensating element 12 and the counter-interface 20.2 of the first component 20 are thus fixable or fixed to one another free of play, with reduced play and/or self-lockingly, in particular clampingly. The thread, in particular the threaded outer portions 12.3 of the compensating element 12, is/are formed, for example, as an external thread with steep external thread pitch. The counter-interface 20.2 of the first component 20 is, for example, provided as an internal thread 20.1 with a steep internal thread pitch corresponding to the steep external thread pitch.

The transport securing means 12.6 serves to ensure that the compensating element 12 cannot be rotated out of the first component 20 (also called the customer interface) in the pre-mounted state for transport or for storage. For this purpose, the transport securing means 12.6 cooperates with a lower edge of the first component 20 as soon as the compensating element 12 is rotated out.

FIG. 16 schematically shows, in a sectional presentation, the first exemplary embodiment of the device 10 according to FIG. 15 after assembly and in the completely mounted state, in which axial and radial plays are compensated. The conical base element 11 and the compensating element 12 are clamped to one another by means of the force-fit connection 15. The first component 20 in its compensating position is fixed to the compensating element 12 self-lockingly.

FIG. 17 schematically shows, in a sectional presentation, a second exemplary embodiment of a device 10 for compensating for tolerances between two components 20 and 30 to be connected to one another in a partially mounted state, in particular prior to a setting of an axial distance 19 between the two components 20 and 30 (shown in FIG. 18) and prior to a compensation of a radial thread play 16 between the compensating element 12 and the first component 20.

FIG. 18 schematically shows, in a sectional presentation, the second exemplary embodiment of the device 10 according to FIG. 17 after assembly, with set axial distance 19 and compensated thread play 16 for fixing the axial position of the first component 20 relative to the further component 30.

The pre-assembly unit 201 formed of compensating element 12 and base element 11 is pre-mounted in the first component 20.

The further component 30 can have an internal thread for the connecting element 13. Alternatively, a nut element (not shown) can be provided below the further component 30 for the connecting element 13.

The setting of the axial distance 19, in particular a compensation of tolerances between the two components 20 and 30, is achieved by a head 13.2 of the connecting element 13 coming into abutment or contact with the base element 11 during insertion into the device 10, in particular into the pre-assembly unit 201. When the connecting element 13 is screwed further into the device 10, in particular the base element 11 is further moved into the compensating element 12 and, after the wedging of these together, they are moved into the first component 20 and the axial distance 19 between the two components 20 and 30 is thus set. In this case, in particular the subassembly formed during this assembly from the compensating element 12 clamped with the base element 11 is moved relative to the first component 20, in particular axially and/or radially, in the first component 20, whereby the axial distance 19 between the two components 20 and 30 is set and/or the thread play 16 is partially or preferably completely reduced.

The coupling between base element 11 and compensating element 12 is a first movement coupling, in particular a wedging movement. The coupling between the compensating element 12 and the first component 20 is a second movement coupling, in particular a play-free, play-reduced and/or self-locking movement thread.

FIG. 19 schematically shows, in a sectional presentation, a third exemplary embodiment of a device 10 for compensating for axial and/or radial tolerances between two components 20 and 30 to be connected to one another, in a pre-mounted state.

The device 10 according to FIGS. 19 to 21 differs from the two previously described examples for the device 10 in the manner of the screw connection and in that the connecting element 13 has an external thread 13.1 and the conical base element 11 has an internal thread 11.3.

The connecting element 13 is inserted and screwed into the conical base element 11 in the insertion direction 14 by the further component 30.

The internal thread 11.3 serves to screw together the device 10. In the first step, the connecting element 13 is screwed into the internal thread 11.3 of the conical base element 11 in the insertion direction 14.

FIG. 20 schematically shows, in a sectional presentation, the third exemplary embodiment of the device 10 according to FIG. 19 after a partial assembly and in a partially mounted state, When the connecting element 13 is screwed into the internal thread 11.3 of the conical base element 11, the compensating element 12 is moved in the compensation direction 17, in particular in the axial direction or z-direction, until it comes to rest or in abutment on the further component 30, counter to the insertion direction 14, in order to fix an axial distance to be set, in particular the axial distance 19 to be set, between the two components 20 and 30, or to compensate for an axial distance, in particular the axial distance 19 to be set, between the two components 20 and 30, shown in FIGS. 20 and 21.

As a result of the further tightening of the connecting element 13 in the internal thread 11.3 of the conical base element 11, the conical base element 11 in the compensating element 12 brings about a wedging and a play-free, play-reduced and/or self-locking connection between the compensating element 12 and the first component 20, so that the device 10 is end-mounted between the two components 20 and 30 in a final assembly position, shown in FIG. 21, with a fixed axial distance 19.

FIG. 21 shows schematically, in a sectional presentation, the third exemplary embodiment of the device 10 according to FIGS. 19 and 20 after assembly and in the fully mounted state in the final assembly position with fixed axial distance 19 between the two components 20 and 30.

FIG. 22 schematically shows, in a sectional presentation, a fourth exemplary embodiment of the device 10 for compensating for tolerances between two components 20 and 30 to be connected to one another in a partially mounted state, in particular prior to a setting of an axial distance 19 between the two components 20 and 30 (shown in FIG. 18) and prior to a compensation of a radial thread play 16 between the compensating element 12 and the first component 20.

FIG. 23 schematically shows, in a sectional presentation, the fourth exemplary embodiment of the device 10 according to FIG. 22 after assembly, with set axial distance 19 and compensated thread play 16 for fixing the axial position of the first component 20 relative to the further component 30.

The pre-assembly unit 201 formed of compensating element 12 and base element 11 is pre-mounted in the first component 20.

The further component 30 can have an internal thread for the connecting element 13. Alternatively, a nut element (not shown) can be provided below the further component 30 for the connecting element 13.

The axial distance 19, in particular a compensation of tolerances between the two components 20 and 30, is set as a result of the compensating element 12 coming into contact with the further component 30 as the connecting element 13 is inserted through the pre-assembly unit 201 into the further component 30 or through the latter into the nut element (not shown). In this case, in particular the subassembly formed during this assembly from the compensating element 12 clamped with the base element 11 is moved relative to the first component 20, in particular axially and/or radially, in the first component 20, whereby the axial distance 19 between the two components 20 and 30 is set and/or the thread play 16 is partially or preferably completely reduced.

By tightening the connecting element 13 with the thread or nut located in the further component 30, the base element 11 is moved axially, in particular pulled and clamped, in the direction of the further component 30, and the thread play 16 between the first component 20 and the compensating element 12 is partially or completely reduced, in particular radially compensated. This set position is fixed ("frozen") by the wedging of the base element 11 and compensating element 12 and the play-free, play-reduced and/or self-locking connection of the compensating element 12 and the first component 20, since the base element 11 and the compensating element 12 can no longer move, in particular rotate, in the first component 20.

The complete elimination of the radial thread play 16 between the first component 20 and the compensating element 12 reduces or prevents noise, in particular rattling, and/or undesired movements.

FIG. 24 schematically shows, in a sectional presentation, an enlarged detail of interface regions of the previously described final-assembled device 10, The connecting element 13 presses the further component 30 in the direction of the conical base element 11 (also called the support element) according to arrow 40, by screwing the connecting element 13, for example at the end, to a nut (not shown in greater detail). Due to this pressure, the conical base element 11 is pressed into the compensating element 12 by the conical outer shape 11.1. In this case, the compensating element 12 can have a conical inner shape 12.1. The conical inner shape 12.1 is widened or expanded by the conical outer shape 11.1, in particular when moving, for example pulling or inserting, the base element 11 into the compensating element 12 in its end position. The inner shape 12.1 can also be cylindrical and the widening or expansion thereof can be generated by a corresponding outer shape 11.1 or geometry of the base element 11.

The thread play 16 (shown in FIG. 14 or 23) is thus removed from the compensating element 12 and the first component 20, and the position is clamped, since the compensating element 12 digs radially into the counter-interface 20.2 of the first component 20.

FIG. 25 schematically shows, in a sectional presentation, an enlarged detail of an interface region of the loose compensating element 12 inserted in the first component 20 with thread play 16.

The threaded outer portions 12.3 of the compensating element 12 are selected to be steep in such a manner that the first component 20 and the compensating element 12 loosely inserted into the first component 20 are arranged outside a self-locking relative to one another.

The connecting element 13 (also called an activation element, in particular an activation screw or an activation bolt) presses on the first component 20 according to arrow 40 when it is screwed into the base element 11 (shown in FIG. 24). As a result of this building pressure, the base element 11 moves into the compensating element 12 and this is deformed and causes a self-locking in the threaded engagement with the first component 20, in particular with the counter-interface 20.2 thereof. In this case, the thread of the threaded outer portions 12.3 of the compensating element 12 digs radially into the internal thread 20.1 of the first component 20 and thereby fixes the final assembly position of the device 10.

FIG. 26 schematically shows, in a perspective presentation, an exemplary embodiment of a changing outer shape 11.1 of the base element 11. The various outer shapes 11.1 of the base element 11 described below can each be used for all previously described examples of the device 10.

The outer shape 11.1 of the base element 11 can have at least two portions 11.7.

In longitudinal extent, the outer shape 11.1 can be formed straight in one portion 11.7 and tapered in an adjoining portion 11.7. The base element 11 can be designed to be oval in cross section with flattened sides.

FIG. 27 schematically shows, in a perspective presentation, yet a further exemplary embodiment of a changing outer shape 11.1 of the base element 11.

In longitudinal extent, the outer shape 11.1 can be formed tapering in all portions 11.7. The base element 11 can be polygonal in cross section.

FIGS. 28-29A schematically show, in each case in a perspective presentation, a fifth exemplary embodiment of a device 10 for compensating for tolerances between two components 20, 30 to be connected to one another (shown in FIGS. 15 and 16). The device 10 comprises the compensating element 12 and the base element 11.

Compared to the previously described examples of the device 10, in the fifth exemplary embodiment according to FIG. 28, in the assembled state, the base element 11 and the compensating element 12 can be axially clamped relative to one another, play-free.

For example, the base element 11 (shown in FIGS. 29, 32) and/or the compensating element 12 (shown in FIGS. 28, 31, and 32) can comprise a plurality of clamping elements 11.01 (shown in FIG. 29) or 12.01, in particular axially protruding from an end face 11.0 (illustrated in FIG. 29) or 12.0, which clamping elements, in the assembled state, clamp the base element 11 and the compensating element 12 play-free axially relative to one another.

In other words, the compensating element 12 differs from the previously described compensating element 12 in that it comprises a number of bracing elements 12.01 on an end side or end face 12.0. The bracing elements 12.01 protrude axially from the end face 12.0 of the compensating element 12. The clamping elements 12.01 are designed, for example, as lugs or nubs or similar.

The base element 11 differs from the previously described base element 11 in that it comprises a number of clamping elements 11.01 on its end side or end face 11.0. The clamping elements 11.01 protrude axially from the end face 11.0 of the base element 11. The clamping elements 11.01 are designed, for example, as lugs or nubs or similar.

In addition, a form-fit connection 32 can be provided between the base element 11 and the compensating element 12. The form-fit connection 32 is designed as a radial form-fit and as an anti-rotation means. By way of example, the base element 11 can comprise two radially outwardly projecting radial stops 11.8 and the compensating element 12 can comprise two inwardly directed radial receptacles 12.10, or, conversely, the base element 11 can have two receptacles and the compensating element can have two stops in the radial direction (not shown).

Such a further or alternative coupling interface between the base element 11 and the compensating element 12 by means of the form-fit connection 32, in particular a radial form-fit connection, can easily and reliably achieve the force-fit connection 15 by axial, in particular translational, wedging between the base element 11 and compensating element 12 by the complementary cone shapes thereof.

In the assembled state, the form-locking connection 32 with integrated anti-rotation device is in particular provided above the force-fit connection 15. For this purpose, the radial receptacles 12.10 and the radial stops 11.8 are provided above the respective cone shape in an edge region of the respective component (base element 11, compensating element 12).

In addition, the base element 11 can have an undercut 11.9 (also referred to as a clearance or shoulder) above the cone shape, in particular above the cone portion serving for the force-fit connection 15. "TS" can thus be pressed inwards.

In addition, the compensating element 12 and the base element 11 can be pre-fixed by means of a pre-latching 34.

FIG. 30 shows a schematic sectional presentation of the fifth exemplary embodiment of the device 10 for compensating for tolerances between two components 20, 30 to be connected to one another in the mounted state.

In the assembled state, the base element 11 and the compensating element 12 are coupled several times to one another, wherein these couplings can be provided alternatively to one another or in combination with different devices 10:

The base element 11 and the compensating element 12 are, for example, clamped axially relative to one another, play-free, in a first coupling interface 36 by means of the clamping elements 10.01 and 12.01 (shown in FIGS. 28 and 29), and/or the base element 11 and the compensating element 12 are, for example, connected to one another, in particular wedged, play-free, with reduced place and/or self-lockingly, in a second coupling interface 37 by means of the force-fit connection 15, and/or the base element 11 and the compensating element 12 are, for example, connected to one another, in particular coupled to one another non-rotatably, in a third coupling interface 38 by means of the form-fit connection 32, in particular a radial form-fit connection, and/or the base element 11 and the compensating element 12 are, for example, coupled to one another, in particular coupled to one another non-rotatably and axially movably, in a fourth coupling interface 39 by means of the pre-latching 34, in particular "inner" pre-latching 34 (shown in FIG. 29).

FIG. 31 schematically shows, in an enlarged sectional presentation, the fifth exemplary embodiment in the region of the first coupling interface 36 for play-free axial clamping by means of the clamping elements 12.01 on the upper end face 12.0 of the compensating element 12 which extend in the direction of a complementary lower end face on the radial stop 11.8 of the base element 11.

FIG. 32 schematically shows, in an enlarged sectional presentation, the fifth exemplary embodiment in a region of a further first coupling interface 36 for play-free axial clamping between the base element 11 and compensating element 12. In this case, the base element 11 comprises, on a lower end face, clamping elements 11.01, which extend in the direction of a complementary upper end face of a shoulder 12.02 of the compensating element 12.

FIG. 33 schematically shows, in a sectional presentation, the pre-latching 34 between the base element 11 and the compensating element 12 for captive transport. The pre-latching 34 comprises a latching receptacle 34.1 on the compensating element 12 and a latching clip 34.2 on the base element 11.

The latching receptacle 34.1 can be designed, for example, as a latching portion on an inner wall or inner surface of the compensating element 12.

The base element 11 has a latching clip 34.2 at one of its ends. For transport, the base element 11 and the compensating element 12 are arranged relative to one another such that the latching clip 34.2 is releasably connected in the latching receptacle 34.1. In this case, the latching clip 34.2 and the latching receptacle 34.1 are connectable to one another, for example by means of a releasable closure, in particular pluggable and rotatable in the manner of a bayonet closure, or are connectable to one another simply in a clamping or latching manner. In this manner, a pre-fixing and the transport securing means 12.6 (shown in FIGS. 5 and 8) are made possible. Thus, the base element 11 and the compensating element 12 cannot fall apart during transport. The base element 11 and the compensating element 12 are not yet wedged conically.

FIGS. 34 and 34a schematically show, in a perspective presentation, the latching clip 34.2 on the base element 11 for the pre-latching 34 or the transport closure in detail. A latching clip 34.2 in the form of a protruding latching tongue or latching lug is preferably provided on opposite sides of the base element 11.

FIG. 35 schematically shows a plan view of the base element 11 and the compensating element 12 with a free space 34.3 between them for plugging or pushing in the transport securing means 12.6, in particular the latching clip 34.2 (shown in FIGS. 33 and 34). In the case of two mutually opposed latching clips 34.2, two mutually opposed latching receptacles 34.1 are provided.

LIST OF REFERENCE SIGNS

10 device for compensating for tolerances
11 base element
11.0 end face
11.01 clamping element
11.1 outer shape
11.2 inner shape
11.3 internal thread
11.4 upper end
11.5 lower end
11.6 retaining bead
11.7 portion
11.8 radial stop
11.9 undercut
12 compensation element
12.0 end face

12.01 clamping element
12.02 shoulder
12.1 inner shape
12.2 cylindrical outer shape
12.3 threaded outer portion
12.31 external thread pitch portion
12.4 thread-free outer portion
12.5 longitudinal end
12.6 transport securing means
12.61 end stop
12.7 molding
12.8 flange
12.9 retaining groove
12.10 radial receptacle
13 connecting element
13.1 external thread
13.2 head
14 insertion direction
15 force-fit connection
16 thread play
17 compensation direction
18 radial direction
19 axial distance
20 first component
20.1 internal thread
20.11 internal thread pitch portion
20.2 counter-interface
30 further components
32 form-fit connection
34 pre-latching
34.1 latching receptacle
34.2 latching clip
34.3 free space
36 first coupling interface
37 second coupling interface
38 third coupling interface
39 fourth coupling interface
40 arrow
120 compensating element
121 expansion region
201 pre-assembly unit
202 pre-connection
x longitudinal extent

The invention claimed is:

1. A device for compensating for tolerances between two components to be connected to one another, wherein the device comprises:

a base element and a compensating element into which the base element is can be inserted, and a connecting element which is inserted through the base element, wherein during assembly, the connecting element comes into engagement with the base element by frictional engagement or in a form-fitting manner, and wherein the compensating element has a changing inner shape and a cylindrical outer shape with one or more threaded outer surface portions and one or more unthreaded outer surface portions, wherein the one or more threaded outer surface portions are adapted to correspond with a threaded portion on one of the two components to be connected to one another.

2. The device according to claim 1, wherein the base element has a changing outer shape and a cylindrical inner shape.

3. The device according to claim 1, wherein the threaded outer surface portions have such a thread that, prior to assembly, a thread play is formed between the one or more threaded outer surface portion of the compensating element and the threaded portion of one of the two components to be connected to one another.

4. The device according to claim 1, wherein the base element is further movable into the compensating element during the assembly process and comes into an engagement such that a thread of the compensating element engages radially in a counter-interface of one of the two components to be connected to one another and these are thereby fixable to one another play-free, with reduced play and/or self-lockingly.

5. The device according to claim 4, wherein a torque exerted by the connecting element can be transmitted to the base element, on the basis of the engagement under force, for rotary entrainment.

6. The device according to claim 1, wherein the compensating element is at least partially deformable.

7. The device according to claim 6, wherein the inner shape of the compensating element is provided with at least one or more expansion regions, wherein said expansion regions are generally U-shaped.

8. The device according to claim 1, wherein the compensating element comprises, at one of its longitudinal ends, a transport securing device for securing the compensating element in one of the two components to be connected to one another during transport and prior to assembly of the device.

9. The device according to claim 8, wherein the transport securing device is formed as a molding projecting radially in portions from an outer circumference.

10. The device according to claim 1, wherein the base element and the compensating element are connectable via a pre-connection to form a pre-assembly unit.

11. The device according to claim 1, wherein, in the assembled state, the base element and the compensating element are axially clamped to one another play-free.

12. The device according to claim 11, wherein the base element and/or the compensating element are provided with a plurality of axially projecting clamping elements, which clamp the base element and the compensating element axially relative to one another play-free in the assembled state.

13. The device according to claim 1, wherein the compensating element has a length, and wherein the one or more unthreaded outer surface portions of the compensating element extend over more of said length of the compensating element than the threaded outer surface portions.

14. The device according to claim 1, wherein the compensating element comprises at least two of said non-threaded outer surface portions.

15. The device according to claim 1, wherein the at least one non-threaded outer surface portion comprises a portion of an outer diameter of the compensating element.

16. The device according to claim 1, wherein the compensating element is free of gaps that extend from the outer diameter of the compensating element to an inner diameter of the compensating element.

17. The device according to claim 1, wherein the at least one non-threaded outer surface portion extends laterally away from the compensating element.

18. A device for compensating for tolerances between two components to be connected to one another, comprising:

a base element, a compensating element into which the base element is inserted, and a connecting element which is inserted through the base element, wherein during assembly, the connecting element comes into engagement with the base element by frictional engagement or in a form-fitting manner, wherein the compensating element has a changing inner shape and a cylindrical outer shape with one or more threaded outer surface portions and one or more unthreaded outer surface portions, wherein the inner shape of the compensating element is provided with at least one or more expansion regions, wherein said expansion regions are generally U-shaped.

\* \* \* \* \*